US011337208B2

(12) United States Patent
Kim et al.

(10) Patent No.: US 11,337,208 B2
(45) Date of Patent: May 17, 2022

(54) METHOD AND APPARATUS FOR TRANSMITTING PHYSICAL DOWNLINK CONTROL CHANNEL IN WIRELESS COMMUNICATION SYSTEM

(71) Applicant: Samsung Electronics Co., Ltd., Gyeonggi-do (KR)

(72) Inventors: Taehyoung Kim, Gyeonggi-do (KR); Jinkyu Kang, Gyeonggi-do (KR); Youngbum Kim, Gyeonggi-do (KR); Seunghoon Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 36 days.

(21) Appl. No.: 17/083,882

(22) Filed: Oct. 29, 2020

(65) Prior Publication Data

US 2021/0160827 A1 May 27, 2021

(30) Foreign Application Priority Data

Nov. 22, 2019 (KR) .......................... 10-2019-0151431

(51) Int. Cl.
*H04W 72/04* (2009.01)
(52) U.S. Cl.
CPC ................................ *H04W 72/042* (2013.01)
(58) Field of Classification Search
CPC ................................................... H04W 72/042
See application file for complete search history.

(56) References Cited

U.S. PATENT DOCUMENTS

| 10,574,388 | B2 | 2/2020 | Lee et al. |
| 10,708,935 | B2 | 7/2020 | Yang et al. |
| 2018/0205522 | A1 | 7/2018 | Wang et al. |
| 2019/0306737 | A1 | 10/2019 | Kwak et al. |
| 2020/0235867 | A1 | 7/2020 | Choi et al. |
| 2021/0289536 | A1* | 9/2021 | Liu ..................... H04L 27/2602 |

FOREIGN PATENT DOCUMENTS

| CN | 110463104 | 11/2019 |
| KR | 1020180013650 | 2/2018 |
| KR | 1020180013673 | 2/2018 |
| KR | 1020190117474 | 10/2019 |

OTHER PUBLICATIONS

Samsung, "Introduction of UE Power Savings", R1-1913207, 3GPP TSG-RAN WG1 Meeting #99, Nov. 18-22, 2019, 11 pages.
International Search Report dated Jan. 26, 2021 issued in counterpart application No. PCT/KR2020/014472, 4 pages.

* cited by examiner

*Primary Examiner* — Ronald B Abelson
(74) *Attorney, Agent, or Firm* — The Farrell Law Firm, P.C.

(57) ABSTRACT

Methods and apparatuses are provided for a wireless communication system in which configuration information on a search space for monitoring a physical downlink control channel (PDCCH) is received from a base station. The configuration information includes information on a plurality of control resource sets (CORESETs) for the PDCCH. A PDCCH candidate set is identified for each of the plurality of CORESETs, based on the configuration information and an offset. The offset is used to adjust an index of a control channel element (CCE) in each PDCCH candidate set. The search space is determined based on the identified PDCCH candidate set for each of the plurality of CORESETs. The PDCCH is monitored based on the determined search space.

20 Claims, 16 Drawing Sheets

METHOD AND APPARATUS FOR TRANSMITTING PHYSICAL DOWNLINK CONTROL CHANNEL IN WIRELESS COMMUNICATION SYSTEM

CROSS-REFERENCE TO RELATED APPLICATION(S)

This application is based on and claims priority under 35 U.S.C. 119(a) to Korean Patent Application No. 10-2019-0151431, filed on Nov. 22, 2019, in the Korean Intellectual Property Office, the disclosure of which is incorporated herein by reference in its entirety.

BACKGROUND

1. Field

The disclosure relates generally to a method and an apparatus for transmitting a physical downlink control channel (PDCCH) in a wireless communication system, and more particularly, to a method and an apparatus for monitoring a PDCCH based on a search space.

2. Description of Related Art

To meet demands of increased wireless data traffic, efforts have been made to develop an improved 5G or pre-5G communication system. Therefore, the 5G or pre-5G communication system is also referred to as a "beyond 4G network" or a "post LTE system".

The 5G communication system is considered to be implemented in higher frequency (mmWave) bands (e.g., 60 GHz bands), so as to achieve higher data rates. To decrease propagation loss of the radio waves and increase the transmission distance, the beamforming, massive multiple-input multiple-output (MIMO), full dimensional MIMO (FD-MIMO), array antenna, analog beam forming, and large scale antenna techniques are discussed in 5G communication systems. In addition, in 5G communication systems, development of system network improvement is based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, hybrid FSK and QAM modulation (FQAM) and sliding window superposition coding (SWSC) have been developed as an advanced coding modulation (ACM), and filter bank multi carrier (FBMC), non-orthogonal multiple access (NOMA), and sparse code multiple access (SCMA) have been developed as an advanced access technology.

The Internet is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth, have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances, and advanced medical services, through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered an example of convergence of the 5G technology with the IoT technology.

With the advance of wireless communication systems as described above, various services can be provided, and accordingly, there is a need for schemes to efficiently provide these services.

SUMMARY

According to an embodiment, a method performed by a terminal in a wireless communication system is provided. Configuration information on a search space for monitoring a PDCCH is received from a base station. The configuration information includes information on a plurality of control resource sets (CORESETs) for the PDCCH. A PDCCH candidate set is identified for each of the plurality of CORESETs, based on the configuration information and an offset. The offset is used to adjust an index of a control channel element (CCE) in each PDCCH candidate set. The search space is determined based on the identified PDCCH candidate set for each of the plurality of CORESETs. The PDCCH is monitored based on the determined search space.

According to an embodiment, a method performed by a base station in a wireless communication system is provided. Configuration information on a search space for monitoring a PDCCH is transmitted to a terminal. The configuration information includes information on a plurality of CORESETs for the PDCCH. The PDCCH is transmitted to the terminal in the search space. A PDCCH candidate set for each of the plurality of CORESETs is identified, based on the configuration information and an offset. The offset is used to adjust an index of a CCE included in each PDCCH candidate set. The search space is determined based on the identified PDCCH candidate set for each of the plurality of CORESETs.

According to an embodiment, a terminal is provided in a wireless communication system. The terminal includes a transceiver and a controller. The controller is configured to control the transceiver to receive, from a base station, configuration information on a search space for monitoring a PDCCH. The configuration information includes information on a plurality of CORESETs for the PDCCH. The controller is also configured to identify a PDCCH candidate set for each of the plurality of CORESETs, based on the configuration information and an offset. The offset is used to adjust an index of a CCE included in each PDCCH candidate set. The controller is further configured to determine the search space based on the identified PDCCH candidate set for each of the plurality of CORESETs, and monitor the PDCCH based on the search space.

According to an embodiment, a base station is provided in a wireless communication system. The base station includes a transceiver and a controller. The controller is configured to control the transceiver to transmit, to a terminal, configuration information on a search space for monitoring a PDCCH.

The configuration information includes information on a plurality of CORESETs for the PDCCH. The controller is also configured to control the transceiver to transmit, to the terminal, the PDCCH in the search space. A PDCCH candidate set for each of the plurality of CORESETs is identified, based on the configuration information and an offset. The offset is used to adjust an index of a CCE included in each PDCCH candidate set. The search space for the PDCCH is determined based on the identified PDCCH candidate set for each of the plurality of CORESETs.

BRIEF DESCRIPTION OF THE DRAWINGS

The above aspects, features, and advantages of the present disclosure will be more apparent from the following detailed description when taken in conjunction with the accompanying drawings, in which.

DETAILED DESCRIPTION

Figure 1:
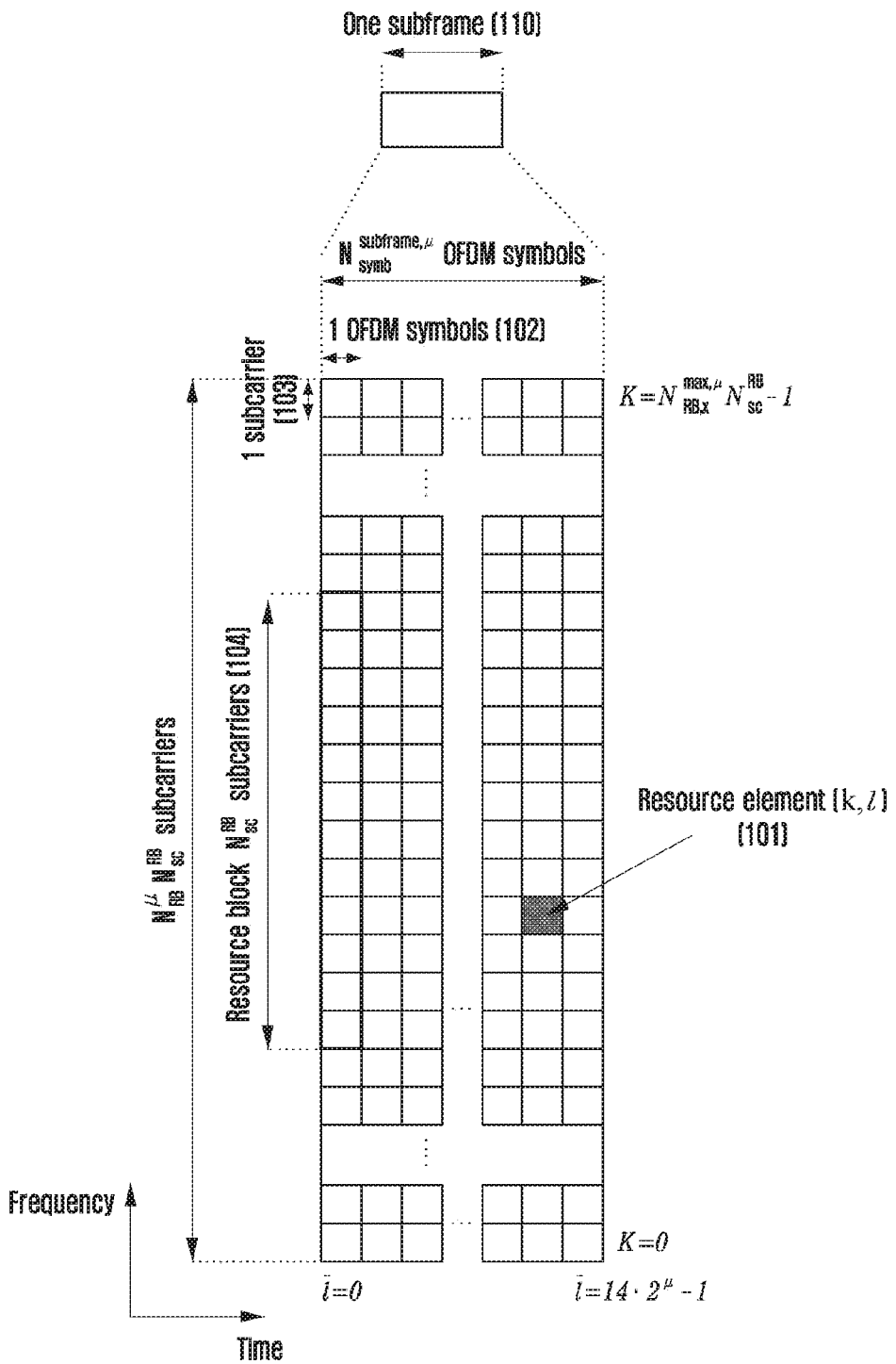
FIG. 1 is a diagram illustrating a basic structure of a time-frequency domain in 5G.

Embodiments of the disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the disclosure.

In the accompanying drawings, some elements may be exaggerated, omitted, or schematically illustrated. Further, the size of each element does not completely reflect the actual size.

The advantages and features of the disclosure and ways to achieve them will be apparent by making reference to embodiments as described below in detail in conjunction with the accompanying drawings. However, the disclosure is not limited to the embodiments set forth below, but may be implemented in various forms. The terms used below are defined in consideration of the functions in the disclosure, and may be different according to users, intentions of the users, or customs. Therefore, the definitions of the terms should be made based on the contents herein.

A base station is an entity that performs resource allocation for a terminal and may be at least one of a gNode B, an eNode B, a Node B, a base station (BS), a radio access unit, a base station controller, or a node in a network. A terminal may include a UE, a mobile station (MS), a cellular phone, a smartphone, a computer, or a multimedia system capable of performing a communication function. Herein, a downlink (DL) is a wireless transmission path for a signal transmitted from a base station to a terminal, and an uplink (UL) is a wireless transmission path for a signal transmitted from a terminal to a base station. Although embodiments of the disclosure will be described with reference to long term evolution (LTE) or LTE-advanced (LTE-A) system as an example, these embodiments of the disclosure may also be applied to other communication systems having a similar technical background or channel form. For example, 5G mobile communication technology (5G or new radio (NR)) developed after LTE-A may be included in these systems, and a 5G system described below may be a concept including existing LTE, LTE-A, and other similar services. The disclosure may be partially modified and applied to other communication systems by a person skilled in the art without departing from the scope of the disclosure.

It is understood that each block of flowchart illustrations, and combinations of blocks in flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process, such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, the term "unit" does not always have a meaning limited to software or hardware. A unit may be constructed either to be stored in an addressable storage medium or to execute one or more processors. Therefore, a unit includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by a unit may be either combined into a smaller number of elements, or a unit, or divided into a larger number of elements, or a unit. Moreover, elements and units may be implemented to reproduce one or more central processing units (CPUs) within a device or a security multimedia card. Further, a unit, as used herein, may include one or more processors.

A wireless communication system is evolving from initially providing voice-oriented services into a broadband wireless communication system for providing high-speed and high-quality packet data services according to a communication standard, for example, high speed packet access (HSPA), LTE or evolved universal terrestrial radio access (E-UTRA), LTE-A, or LTE-Pro of the $3^{rd}$ Generation Partnership Project (3GPP), high rate packet data (HRPD) or ultra-mobile broadband (UMB) of the 3GPP2, and IEEE 802.16e.

As a representative example of the broadband wireless communication system, an LTE system employs an orthogonal frequency division multiplexing (OFDM) scheme for a DL and employs a single-carrier frequency division multiple access (SC-FDMA) scheme for an UL. The uplink refers to a radio link for a UE or a MS to transmit data or a control signal to an eNode B or a BS, and the downlink refers to a radio link for the eNode B to transmit data or a control signal to the UE. These multiple access schemes may generally allocate and manage time-frequency resources for carrying data or control information per user not to overlap with each other, that is, to be orthogonal to each other, thereby dividing data or control information for each user.

A post-LTE communication system, such as, for example, a 5G communication system needs to be able to freely reflect various demands from users and service providers, and is thus required to support services satisfying various requirements at the same time. Services considered for a 5G communication system include enhanced mobile broadband (eMBB), massive MTC (mMTC), ultra-reliability and low-latency communications (URLLC), and the like.

eMBB is intended to provide a further enhanced data rate than that supported by existing LTE, LTE-A, or LTE-Pro systems. For example, in a 5G communication system, for one base station, eMBB needs to be able to provide a peak data rate of 20 Gbps in a downlink and a peak data rate of 10 Gbps in an uplink. Further, the 5G communication system needs not only to provide the peak data rate but also to provide an increased user-perceived data rate. In order to meet these requirements, various improved transmission and reception technologies including an enhanced MIMO transmission technology are required. In addition, while an LTE system transmits a signal using a transmission bandwidth of up to 20 MHz in a 2-GHz band, the 5G communication system may employ a frequency bandwidth wider than 20 MHz in a frequency band ranging from 3 to 6 GHz or a 6-GHz frequency band or higher, making it possible to satisfy a data rate required for the 5G communication system.

In the 5G communication system, mMTC is taken into consideration to support application services, such as the IoT. To efficiently provide the IoT, mMTC requires support for access of a great number of UEs in a cell, enhanced UE coverage, increased battery time, reduced UE cost, and the like. The IoT is attached to various sensors and various devices to provide a communication function, and thus, needs to be able to support a large number of UEs (e.g., 1,000,000 UEs/km$^2$) in a cell. A UE supporting mMTC is highly likely to be located in a shadow area not covered by a cell, such as the basement of a building, due to the nature of services and may thus require wider coverage than for other services provided by the 5G communication system. A UE supporting mMTC needs to be configured as a low-cost UE, and may require a very long battery life time of 10 to 15 years because it is difficult to frequently change the battery of the UE.

Finally, URLLC is a mission-critical cellular-based wireless communication service. URLLC may be used, for example, for remote control of robots or machinery, industrial automation, unmanned aerial vehicles, remote health care, emergency alerts, and the like. Therefore, URLLC needs to provide ultralow-latency and ultrahigh-reliability communication. For example, a URLLC-supporting service is required not only to satisfy an air interface latency of less than 0.5 milliseconds but also to have a packet error rate of 10- or less. Therefore, for the URLLC-supporting service, a 5G system needs to provide a shorter transmission time interval (TTI) than that of other services and also requires a design for allocating a wide resource in a frequency band in order to secure the reliability of a communication link.

The three services of the 5G system, that is, mMTC, URLLC, and eMBB, may be transmitted via multiplexing in one system. Here, different transmission and reception schemes and different transmission and reception parameters may be used for the respective services in order to meet different requirements of the respective services. The 5G system is not limited to the foregoing three services.

Hereinafter, a frame structure of a 5G system will be described in detail with reference to accompanying drawings.

FIG. 1 is a diagram illustrating a basic structure of a time-frequency domain, which is a radio resource region in which a data or control channel is transmitted in a 5G system.

In FIG. 1, the horizontal axis represents a time domain, and the vertical axis represents a frequency domain. The basic unit of a resource in the time-frequency domain is a resource element (RE) 101, which may be defined by one OFDM symbol 102 on the time axis and one subcarrier 103 on the frequency axis. In the frequency domain, $N_{SC}^{RB}$ (e.g., 12) consecutive REs may form one resource block (RB) 104.

Figure 2:
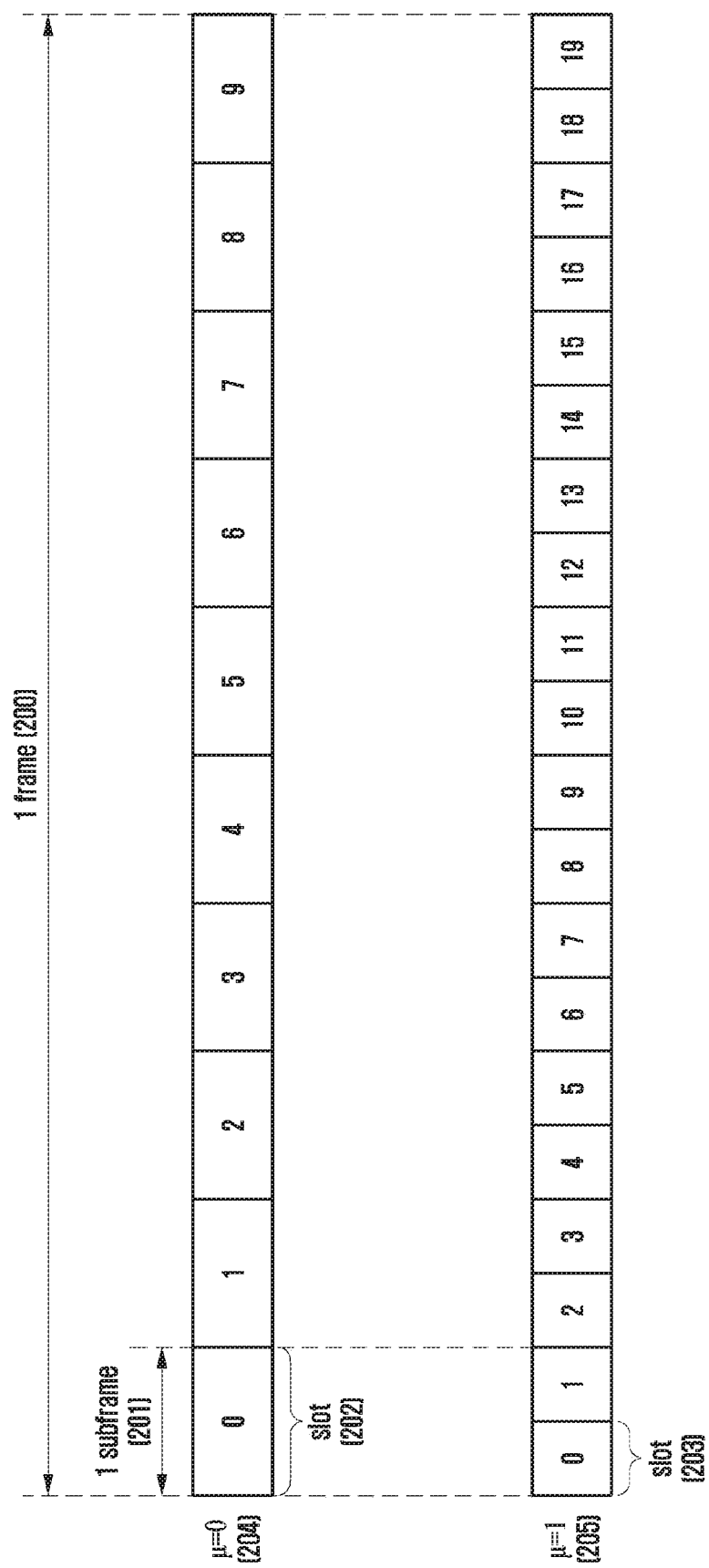
FIG. 2 is a diagram illustrating structures of a frame, a subframe, and a slot in 5G.

FIG. 2 is a diagram illustrating a slot structure considered in a 5G system.

FIG. 2 illustrates one example of structures of a frame 200, a subframe 201, and a slot 202. One frame 200 may be defined as 10 ms. One subframe 201 may be defined as 1 ms. Therefore, one frame 200 may include a total of ten subframes 201. One slot 202 and 203 may slot be defined as 14

OFDM symbols (i.e., the number of symbols per slot ($N_{symb}^{slot}$)=14). One subframe 201 may include one or a plurality of slots 202 and 203, and the number of slots 202 and 203 per subframe 201 may vary depending on a set subcarrier spacing value p 204 and 205. In the example of FIG. 2, when μ=0 (204), one subframe 201 may include one slot 202, and when μ=1 (205), one subframe 201 may include two slots 203. That is, the number of slots per subframe ($N_{slot}^{subframe,\mu}$) may vary depending on the set subcarrier spacing value μ, and the number of slots per frame ($N_{slot}^{frame,\mu}$) may vary accordingly. $N_{slot}^{subframe,\mu}$ and $N_{slot}^{frame,\mu}$ according to each subcarrier spacing setting p may be defined as in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Figure 3:
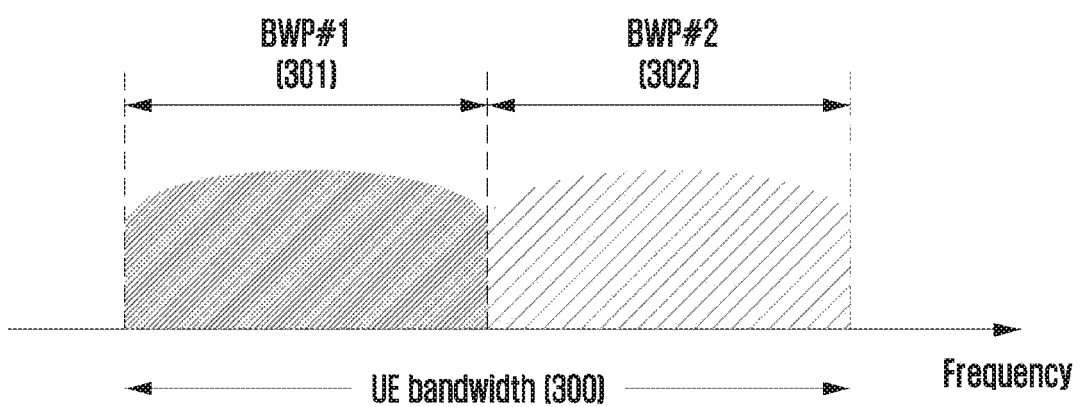
FIG. 3 is a diagram illustrating an example of a bandwidth part (BWP) configuration in 5G.

FIG. 3 is a diagram illustrating an example of a BWP configuration in a 5G communication system.

FIG. 3 shows an example in which a UE bandwidth 300 is configured with two BWPs, that is, BWP #1 301 and BWP #2 302. A base station may configure one BWP or a plurality of BWPs for a UE and may configure information about each BWP as set forth in Table 2.

TABLE 2

| BWP ::= | SEQUENCE { |
|---|---|
| bwp-Id | BWP-Id |
| (Bandwidth part identifier) | |
| locationAndBandwidth | INTEGER (1..65536), |
| (Bandwidth part location) | |
| subcarrierSpacing | ENUMERATED |
| (Subcarrier spacing) | {n0, n1, n2, n3, n4, n5} |
| cyclicPrefix | ENUMERATED |
| (Cyclic prefix) | { extended } |
| } | |

In addition to the above pieces of configuration information, various parameters related to the BWP may be configured for the UE. These pieces of information may be transmitted from the base station to the UE via higher-layer signaling, for example, radio resource control (RRC) signaling. At least one of the one configured BWP or the plurality of configured BWPs may be activated. Whether to activate a configured BWP may be indicated from the base station to the UE semi-statically through RRC signaling or dynamically through downlink control information (DCI).

According to an embodiment, a UE before RRC connection may be allocated an initial BWP for initial access from a base station through a master information block (MIB). Specifically, the UE may receive configuration information about a CORESET and a search space for transmitting a PDCCH for receiving system information necessary for initial access (which may correspond to remaining system information (RMSI) or system information block 1 (SIB1)) through the MIB in an initial access process.

The control resource set and the search space configured by the MIB may be regarded as identities (IDs) 0, respectively. The base station may notify the UE of configuration information, such as frequency allocation information, time allocation information, and numerology, about control resource set #0 through the MIB. In addition, the base station may notify the UE of configuration information about a monitoring period and an occasion for control resource set #0, that is, configuration information about search space #0, through the MIB. The UE may regard a frequency region configured as control resource set #0 obtained from the MIB as an initial BWP for initial access. In this case, the ID of the initial BWP may be regarded as 0.

A configuration of a BWP supported by the 5G communication system may be used for various purposes.

According to some embodiments, when a bandwidth supported by a UE is smaller than a system bandwidth, the configuration of a BWP may be used. For example, the frequency position of the BWP (configuration information 2) may be configured for the UE, enabling the UE to transmit and receive data at a particular frequency position within the system bandwidth.

Further, a base station may configure a plurality of BWPs for a UE in order to support different numerologies. For example, in order to support data transmission and reception using both a subcarrier spacing of 15 kHz and a subcarrier spacing of 30 kHz for a UE, two BWPs may be configured with a subcarrier spacing of 15 kHz and a subcarrier spacing of 30 kHz, respectively. Different BWPs may be subjected to frequency division multiplexing (FDM). To transmit and receive data with particular subcarrier spacing, a BWP configured with the subcarrier spacing may be activated.

In addition, according to some embodiments, a base station may configure BWPs having different bandwidths for a UE in order to reduce power consumption of the UE. For example, when a UE supports a very large bandwidth (e.g., a bandwidth of 100 MHz), and always transmits and receives data in the bandwidth, a great amount of power may be consumed. In particular, it may be very inefficient in power consumption to unnecessarily monitor a downlink control channel over the large bandwidth of 100 MHz even when there is no traffic. Therefore, in order to reduce power consumption of the UE, the base station may configure a BWP having a relatively small bandwidth, for example, a BWP of 20 MHz, for the UE. The UE may perform a monitoring operation in the 20-MHz BWP in the absence of traffic, and the UE may transmit and receive data using the 100-MHz bandwidth according to an indication from the base station when the data is generated.

In a method of configuring a BWP, UEs before RRC connection may receive configuration information about an initial BWP through an MIB in an initial access process. Specifically, a UE may be allocated a CORESET for a downlink control channel for transmitting downlink control information (DCI) for scheduling a SIB from the MIB of a physical broadcast channel (PBCH). The bandwidth of the control resource set configured through the MIB may be regarded as an initial BWP, and the UE may receive a physical downlink shared channel (PDSCH), through which an SIB is transmitted, through the configured initial BWP. In addition to the purpose of receiving an SIB, the initial BWP may be used for other system information (OSI), paging, and random access.

A synchronization signal (SS)/PBCH block may refer to a physical-layer channel block including a primary SS (PSS), a secondary SS (SSS), and a PBCH. Specifically, the SS/PBCH block is described as follows.

PSS: A reference signal for downlink time/frequency synchronization, which provides some information of a cell ID.

SSS: Serves as a reference for downlink time/frequency synchronization and provides remaining information of the cell ID which is not provided by the PSS. Additionally, the SSS may serve as a reference signal for demodulation of a PBCH.

PBCH: Provides essential system information required for transmission and reception of a data channel and a control channel by a UE. The essential system information may include search space-related control information indicating radio resource mapping information about a control channel, scheduling control information for a separate data channel for transmitting system information, and the like.

SS/PBCH block: An SS/PBCH block includes a combination of a PSS, an SSS, and a PBCH. One SS/PBCH block or a plurality of SS/PBCH blocks may be transmitted within a time of 5 ms, and each transmitted SS/PBCH block may be identified by an index.

A UE may detect a PSS and an SSS, and may decode a PBCH in an initial access process. An MIB may be obtained from the PBCH, and CORESET #0 (which may correspond to a control resource set having a control resource set index of 0) may be configured through the MIB. The UE may monitor CORESET #0 assuming that a selected SS/PBCH block and a DMRS transmitted via CORESET #0 are quasi-co-located (QCLed). The UE may receive system information via downlink control information transmitted through CORESET #0. The UE may obtain configuration information about a random access channel (RACH) necessary for initial access from the received system information. The UE may transmit a physical RACH (PRACH) to a base station in consideration of a selected SS/PBCH index, and the base station receiving the PRACH may obtain information about the SS/PBCH block index selected by the UE. The base station can know that the UE selects a block among individual SS/PBCH blocks and monitors CORESET #0 associated with this block.

In a 5G system, scheduling information for uplink data (or a physical uplink shared channel (PUSCH)) or downlink data (or a PDSCH) is provided from a base station to a UE through DCI. The UE may monitor a fallback DCI format and a non-fallback DCI format for a PUSCH or PDSCH. The fallback DCI format may be configured with a fixed field predefined between the base station and the UE, and the non-fallback DCI format may include a configurable field.

The DCI may be transmitted through a PDCCH via channel coding and modulation. A cyclic redundancy check (CRC) may be attached to the payload of a DCI message and may be scrambled with a radio network temporary identifier (RNTI) corresponding to the identity of a UE. Different RNTIs may be used depending on the purpose of the DCI message, for example, UE-specific data transmission, a power control command, or a random access response. That is, an RNTI is not explicitly transmitted but is included in a CRC calculation process. Upon receiving the DCI message transmitted on the PDCCH, the UE may identify the CRC using the allocated RNTI, and may recognize that the message is transmitted to the UE when the CRC is correct.

For example, DCI for scheduling a PDSCH for system information (SI) may be scrambled with an SI-RNTI. DCI for scheduling a PDSCH for a random access response (RAR) message may be scrambled with random access RNTI (RA-RNTI). DCI for scheduling a PDSCH for a paging message may be scrambled with a paging RNTI (P-RNTI). DCI for notifying a slot format indicator (SFI) may be scrambled with an SFI-RNTI. DCI for notifying transmit power control (TPC) may be scrambled with a TPC-RNTI. DCI for scheduling a UE-specific PDSCH or a PUSCH may be scrambled with a cell RNTI (C-RNTI).

DCI format 0_0 may be used as fallback DCI for scheduling a PUSCH, in which a CRC may be scrambled with a C-RNTI. DCI format 0_0 in which the CRC is scrambled with the C-RNTI may include, for example, the following information provided in Table 3.

- Identifier for DCI formats - [1] bit
- Frequency domain resource assignment -
  [ $\log_2(N_{RB}^{UL,BWP}(N_{RB}^{UL,BWP}+1)/2)$ ] bits
- Time domain resource assignment - X bits
- Frequency hopping flag - 1 bit
- Modulation and coding scheme - 5 bits
- New data indicator - 1 bit
- Redundancy version - 2 bits
- HARQ process number - 4 bits
- Transmit power control (TPC) command for scheduled PUSCH - [2] bits
- UL/SUL indicator - 0 or 1 bit DCI format 0_1 may be used as fallback DCI for scheduling a PUSCH, in which a CRC may be scrambled with a C-RNTI. DCI format 01 in which the CRC is scrambled with the C-RNTI may include, for example, the following information provided in Table 4a and Table 4b.

TABLE 4a

- Carrier indicator - 0 or 3 bits
- UL/SUL indicator - 0 or 1 bit
- Identifier for DCI formats - [1] bit
- Bandwidth part indicator - 0, 1, or 2 bits
- Frequency domain resource assignment
    • For resource allocation type 0, [ $N_{RB}^{UL,BWP}/P$ ] bits
    • For resource allocation type 1, [ $\log_2(N_{RB}^{UL,BWP}(N_{RB}^{UL,BWP}+1)/2)$ ] bits
- Time domain resource assignment -1, 2, 3, or 4 bits
- Virtual resource block (VRB)-to-physical resource block (PRB) mapping - 0 or 1 bit, only for resource allocation type 1
    • 0 bit if only resource allocation type 0 is configured
    • 1 bit otherwise
- Frequency hopping flag - 0 or 1 bit, only for resource allocation type 1.
    • 0 bit if only resource allocation type 0 is configured
    • 1 bit otherwise
- Modulation and coding scheme - 5 bits
- New data indicator - 1 bit
- Redundancy version - 2 bits
- HARQ process number - 4 bits
- 1st downlink assignment index - 1 or 2 bits
    • 1 bit for semi-static HARQ-ACK codebook
    • 2 bits for dynamic HARQ-ACK codebook with single HARQ-ACK codebook TABLE 4b

- 2nd downlink assignment index—0 or 2 bits
  • 2 bits for dynamic HARQ-ACK codebook with two HARQ-ACK sub-codebooks
  • 0 bit otherwise
- TPC command for scheduled PUSCH—2 bits

- SRS resource indicator—$\left\lceil \log_2\left(\sum_{k=1}^{L_{root}} \binom{N_{SRS}}{k}\right) \right\rceil$ or $\lceil \log_2(N_{SRS}) \rceil$ bits

• $\left\lceil \log_2\left(\sum_{k=1}^{L_{root}} \binom{N_{SRS}}{k}\right) \right\rceil$ bits for non-codebook-based PUSCH transmission
  • $\lceil \log_2(N_{SRS}) \rceil$ bits for codebook-based PUSCH transmission
- Precoding information and number of layers—up to 6 bits
- Antenna ports—up to 5 bits
- SRS request—2 bits
- Channel state information (CSI) request—0, 1, 2, 3, 4, 5, or 6 bits
- Code block group (CBG) transmission information—0, 2, 4, 6, or 8 bits
- Phase tracking reference signal (PTRS)-demodulation reference signal (DMRS) association—0 or 2 bits
- beta_offset indicator—0 or 2 bits
- Demodulation reference signal (DMRS) sequence initialization—0 or 1 bit DCI format 1_0 may be used as fallback DCI for scheduling a PDSCH, in which a CRC may be scrambled with a C-RNTI. DCI format 1_0 in which the CRC is scrambled with the C-RNTI may include, for example, the following information provide in Table 5.

TABLE 5

- Identifier for DCI formats - [1] bit
- Frequency domain resource assignment - $\lceil \log_2(N_{RB}^{UL,BWP}(N_{RB}^{UL,BWP}+1)/2) \rceil$ bits
- Time domain resource assignment - X bits
- VRB-to-PRB mapping - 1 bit
- Modulation and coding scheme - 5 bits
- New data indicator - 1 bit
- Redundancy version - 2 bits
- HARQ process number - 4 bits
- Downlink assignment index - 2 bits
- TPC command for scheduled PUCCH - [2] bits
- Physical uplink control channel (PUCCH) resource indicator - 3 bits
- PDSCH-to-HARQ feedback timing indicator - [3] bits DCI format 1_1 may be used as non-fallback DOI for scheduling a PDSCH, in which a CRC may be scrambled with a C-RNTI. DCI format 1_1 in which the CRC is scrambled with the C-RNTI may include, for example, the following information provided in Table 6.

TABLE 6

- Carrier indicator - 0 or 3 bits
- Identifier for DCI formats - [1] bit
- Bandwidth part indicator - 0, 1, or 2 bits
- Frequency domain resource assignment
  • For resource allocation type 0, $\lceil N_{RB}^{UL,BWP}/P \rceil$ bits
  • For resource allocation type 1, $\lceil \log_2(N_{RB}^{UL,BWP}(N_{RB}^{UL,BWP}+1)/2) \rceil$ bits
- Time domain resource assignment -1, 2, 3, or 4 bits
- VRB-to-PRB mapping - 0 or 1 bit, only for resource allocation type 1
  • 0 bit if only resource allocation type 0 is configured
  • 1 bit otherwise
- PRB bundling size indicator - 0 or 1 bit
- Rate matching indicator - 0, 1, or 2 bits
- Zero-power (ZP) CSI-RS trigger - 0, 1, or 2 bits
For transport block 1:
- Modulation and coding scheme - 5 bits
- New data indicator - 1 bit TABLE 6-continued

- Redundancy version - 2 bits
For transport block 2:
- Modulation and coding scheme - 5 bits
- New data indicator - 1 bit
- Redundancy version - 2 bits
- HARQ process number - 4 bits
- Downlink assignment index - 0, 2, or 4 bits
- TPC command for scheduled PUCCH - 2 bits
- PUCCH resource indicator - 3 bits
- PDSCH-to-HARQ feedback timing indicator - 3 bits
- Antenna ports - 4, 5, or 6 bits
- Transmission configuration indication - 0 or 3 bits
- SRS request - 2 bits
- CBG transmission information - 0, 2, 4, 6, or 8 bits
- CBG flushing out information - 0 or 1 bit
- DMRS sequence initialization - 1 bit A base station may configure a table of time-domain resource allocation information for a downlink data channel (PDSCH) and an uplink data channel (PUSCH) for a UE via higher-layer signaling (e.g., RRC signaling). The base station may configure a table of up to maxNrofDL-Allocations=16 entries for the PDSCH and may configure a table of up to maxNrofJL-Allocations=16 entries for the PUSCH. The time-domain resource allocation information may include, for example, a PDCCH-to-PDSCH slot time (corresponding to a time interval in slots between time when a PDCCH is received and time when a PDSCH scheduled by the received PDCCH is transmitted, denoted by K0) or a PDCCH-to-PUSCH slot time (corresponding to a time interval in slots between time when a PDCCH is received and time when a PUSCH scheduled by the received PDCCH is transmitted, denoted by K2), information about the position and length of a starting symbol in which a PDSCH or PUSCH is scheduled within a slot, a PDSCH or PUSCH mapping type, and the like. For example, information illustrated in Table 7 and Table 8 may be notified by the base station to the UE.

TABLE 7

PDSCH-TimeDomainResourceAllocationListinformation element

PDSCH-TimeDomainResourceAllocationList ::= SEQUENCE (SIZE(1..max-NrofDL-Allocations)) OF
  PDSCH-TimeDomainResourceAllocation
  PDSCH-TimeDomainResourceAllocation ::= SEQUENCE {
    k0    INTEGER(0..32)    OPTIONAL,  -- Need S
    (PDCCH-to-PDSCH timing, in slots)
    mappingType    ENUMERATED {typeA, typeB},
    (PDSCH mapping type)
    startSymbolAndLength    INTEGER(0..127)
    (Starting symbol and length of PDSCH)
}

TABLE 8

PUSCH-TimeDomainResourceAllocationListinformation element

PUSCH-TimeDomainResourceAllocationList ::= SEQUENCE
(SIZE( 1..maxNrofDL-Allocations)) OF
  PUSCH-TimeDomainResourceAllocation
  PUSCH-TimeDomainResourceAllocation ::= SEQUENCE {
    k0    INTEGER(0..32)    OPTIONAL,  -- Need S
    (PDCCH-to-PUSCH timing, in slots)
    mappingType    ENUMERATED {typeA., typeB},
    (PUSCH mapping type)
    startSymbolAndLength    INTEGER(0..127)
    (Starting symbol and length of PUSCH)
}

The base station may notify the UE of one of the entries in the table of the time-domain resource allocation information through L1 signaling (e.g., DCI, specifically via a time-domain resource allocation field in the DCI). The UE may obtain the time-domain resource allocation information for the PDSCH or PUSCH based on the DCI received from the base station.

Figure 4:
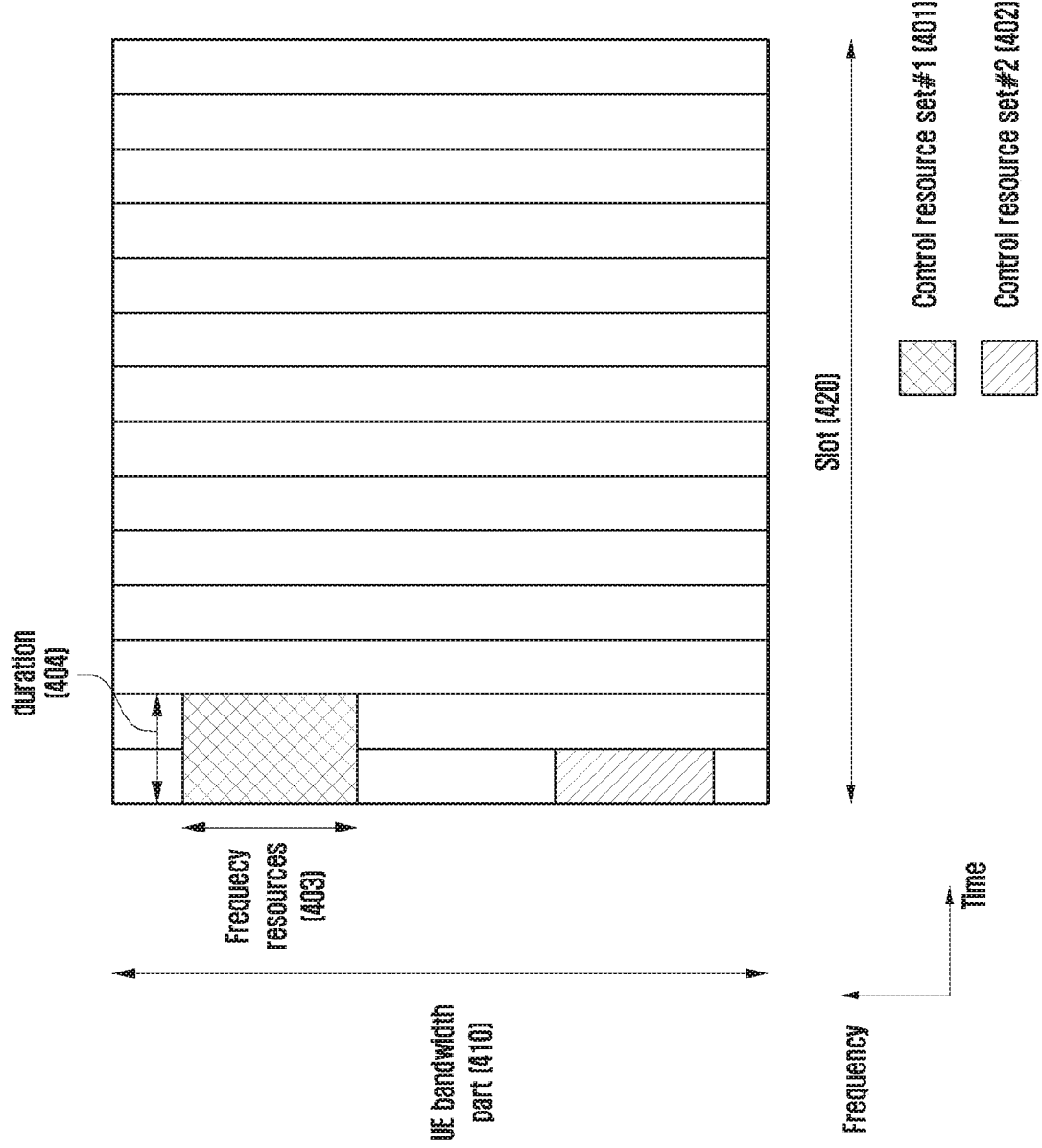
FIG. 4 is a diagram illustrating an example of a CORESET configuration for a downlink control channel in 5G.

FIG. 4 is a diagram illustrating an example of a CORESET through which a downlink control channel is transmitted in a 5G wireless communication system.

FIG. 4 shows an example in which two control resource sets (CORESET #1 401 and CORESET #2 402) are configured within a UE BWP 410 on a frequency axis and one slot 420 on a time axis. The CORESETs 401 and 402 may be configured in a specific frequency resource 403 within the entire UE BWP 410 on the frequency axis. The CORESETs 401 and 402 may be configured with one OFDM symbol or a plurality of OFDM symbols on the time axis, which may be defined as a control resource set duration 404. CORESET #1 401 is configured with a control resource set duration of two symbols, and CORESET #2 402 is configured with a control resource set duration of one symbol.

The CORESET in 5G described above may be configured by a base station for a UE via higher-layer signaling (e.g., system information, a MIB, or RRC signaling). Configuring a CORESET for a UE means providing information, such as the identity of the CORESET, a frequency position of the CORESET, the symbol duration of the CORESET, or the like. For example, the following information of Table 9 may be included.

TABLE 9

```
ControlResourceSet ::=                         SEQUENCE {
   -- Corresponds to L1 parameter 'CORESET-ID'
   controlResourceSetId                        ControlResourceSetId,
      (Control resource set identity)
   frequencyDomainResources                    BIT STRING
                                               (SIZE (45)),
      (Frequency-domain resource allocation information)
   duration                                    INTEGER (1..max-
                                               CoReSetDuration),
      (Time-domain resource allocation information)
   cce-REG-MappingType                         CHOICE {
      (CCE-to-REG mapping type)
      interleaved                              SEQUENCE {
         reg-BundleSize                        ENUMERATED
         (REG bundle size)                     {n2, n3, n6},
         precoderGranularity                   ENUMERATED
{sameAsREG-bundle,
allContiguousRBs}
         interleaverSize                       ENUMERATED
         (interleaver size)                    {n2, n3, n6}
         shiftIndex
   INTEGER(0..maxNrofPhysicalResourceBlocks-1)
      OPTIONAL,
         (Interlever shift)
      },
      nonInterleaved                           NULL
   },
   tci-StatesPDCCH                             SEQUENCE(SIZE
(1..maxNrofTCI-StatesPDCCH))                   OPTIONAL,
OF TCI-StateId
      (QCT configuration information)
   tci-PresentInDCI                            ENUMERATED
                                               {enabled}
}
```

In Table 9, tci-StatesPDCCH (simply referred to as a TCI state) configuration information may include information about the index of one or a plurality of SSs/PBCH blocks in a quasi-co-location (QCL) relationship with a DMRS transmitted in a corresponding control resource set or the index of a channel state information reference signal (CSI-RS).

Figure 5:
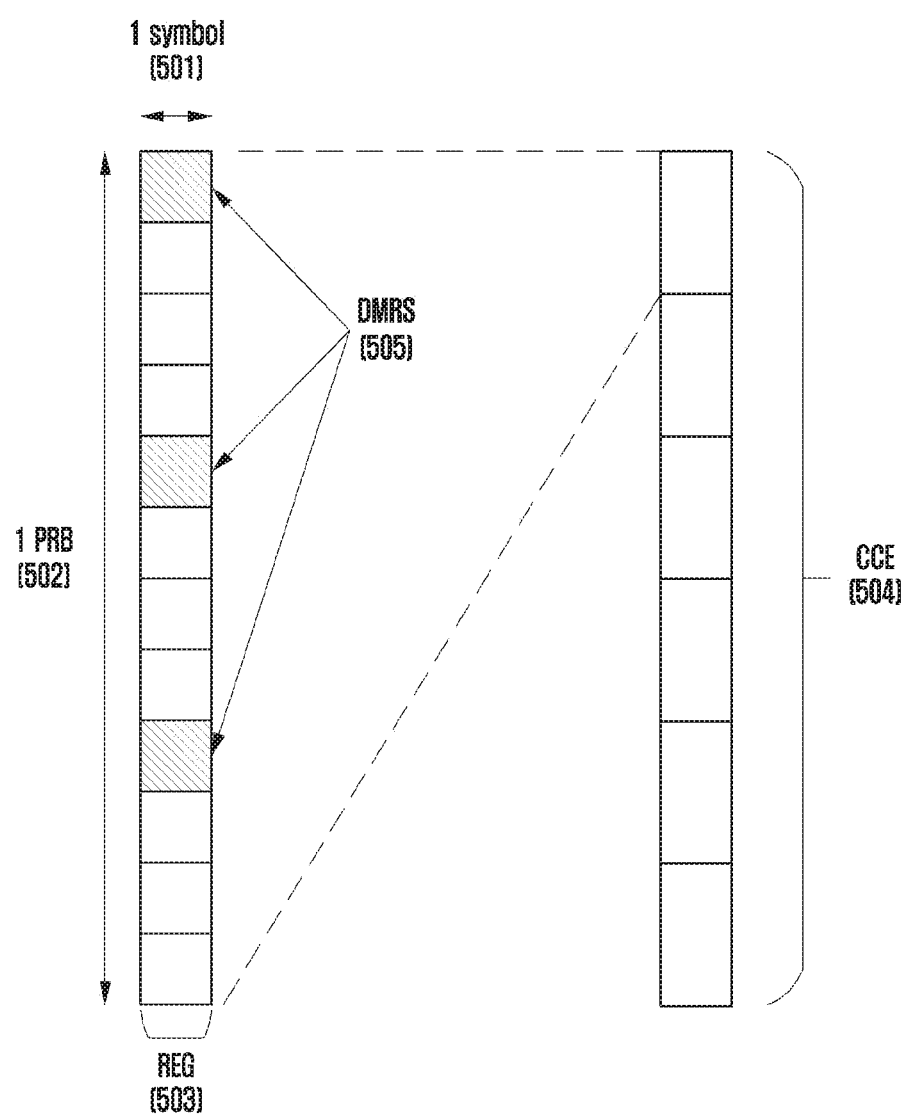
FIG. 5 is a diagram illustrating the structure of a downlink control channel available in 5G.

FIG. 5 is a diagram illustrating an example of a basic unit of time and frequency resources forming a downlink control channel available in 5G. A basic unit of time and frequency resources forming a control channel may be referred to as a resource element group (REG) 503, and the REG 503 may be defined by one OFDM symbol 501 on the time axis and one PRB 502, that is, 12 subcarriers, on the frequency axis. A base station may configure a downlink control channel allocation unit by connecting the REG 503.

As shown in FIG. 5, when a basic unit to which a downlink control channel is allocated in 5G is defined as CCE 504, one CCE 504 may include a plurality of REGs 503. Referring to the REG 503 shown in FIG. 5 as an example, the REG 503 may include 12 REs, and when one CCE 504 includes six REGs 503, one CCE 504 may include 72 REs. When a downlink CORESET is configured, a corresponding region may include a plurality of CCEs 504, and a specific downlink control channel may be mapped to one or more CCEs 504 according to an aggregation level (AL) in the CORESET and may be transmitted. The CCEs 504 in the CORESET are distinguished by numbers, in which case the numbers of the CCEs 504 may be assigned according to a logical mapping method.

The basic unit of the downlink control channel shown in FIG. 5, that is, the REG 503, may include both REs mapped to DCI and a region mapped to a DMRS 505, which is a reference signal for decoding the DCI. As shown in FIG. 5, three DMRSs 505 may be transmitted within one REG 503. The number of CCEs required to transmit a PDCCH may be 1, 2, 4, 8, or 16 according to an AL, and different numbers of CCEs may be used to implement link adaptation of the downlink control channel. For example, when AL=L, one downlink control channel may be transmitted through L CCEs.

A UE needs to detect a signal without having information about the downlink control channel, and a search space representing a set of CCEs is defined for blind decoding. The search space is a set of downlink control channel candidates including CCEs which the UE needs to attempt to decode in an assigned aggregation level. Since there are different aggregation levels to make 1, 2, 4, 8, or 16 CCEs into one bundle, the UE may have a plurality of search spaces. A search space set may be defined as a set of search spaces in all configured aggregation levels.

Search spaces may be classified into a common search space and a UE-specific search space. A certain group of UEs or all UEs may examine a common search space for a PDCCH in order to receive cell-common control information, such as dynamic scheduling or a paging message for system information. For example, PDSCH scheduling allocation information for transmission of an SIB including cell operator information or the like may be received by examining the common search space for the PDCCH. Since the certain group of UEs or all UEs need to receive the PDCCH, the common search space may be defined as a set of pre-agreed CCEs. Scheduling allocation information about a UE-specific PDSCH or PUSCH may be received by examining a UE-specific search space for the PDCCH. The UE-specific search space may be UE-specifically defined by a function of a UE identity and various system parameters.

In 5G, a parameter for a search space for a PDCCH may be configured by a base station for a UE via higher-layer signaling (e.g., an SIB, an MIB, or RRC signaling). For example, the base station may configure, for the UE, the number of PDCCH candidates in each aggregation level L, a monitoring period for a search space, a monitoring occasion in symbols in a slot for a search space, a search space type (common search space or UE-specific search space), a combination of a DCI format and an RNTI for monitoring in a search space, and a control resource set index for monitoring a search space. For example, the following information of connected Tables 10a and 10b may be included.

TABLE 10a

```
SearchSpace ::=                        SEQUENCE {
  -- Identity of the search space. SearchSpaceId = 0 identifies the SearchSpace
configured via PBCH (MIB) or ServingCellConfigCommon.
    searchSpaceId                      SearchSpaceId,
      (Search space identity)
    controlResourceSetId               ControlResourceSetId,
      (Control resource set identity)
    monitoringSlotPeriodicityAndOffset CHOICE {
      (Monitoring slot level periodicity)
        sl1                            Null
        sl2                            Integer (0..1),
        sl4                            Integer (0..3),
        sl5                            Integer (0..4),
        sl8                            Integer (0..7),
        sl10                           Integer (0..9),
        sl16                           integer (0..15),
        sl20                           integer (0..19)
    }
    duration (monitoring duration)     INTEGER (2..2559)
    monitoringSymbolsWithinSlot        BIT STRING (SIZE 14))
      (Monitoring symbols within slot)
    nrofCandidates                     SEQUENCE {
      (Number of PDCCH candidates per aggregation level)
        aggregationLevel1              ENUMERATED {n0, n1, n2, n3, n4, n5,
                                                   n6, n8},
        aggregationLevel2              ENUMERATED
                                       {n0, n1, n2, n3, n4, n5, n6, n8},
        aggregationLevel4              ENUMERATED
                                       {n0, n1, n2, n3, n4, n5, n6, n8},
        aggregationLevel8              ENUMERATED
                                       {n0, n1, n2, n3, n4, n5, n6, n8},
        aggregationLevel16             ENUMERATED
                                       {n0, n1, n2, n3, n4, n5, n6, n8}
},
```

TABLE 10b

```
searchSpaceType            CHOICE {
  (Search space type)
    -- Configures this search space as common search
    space (CSS) and DCI
formats to monitor.
    common                 SEQUENCE {
      (Common search space)
    }
    ue-Specific            SEQUENCE {
      (UE-specific search space)
        -- Indicates whether the UE monitors in this USS
        for DCI formats 0-0 and
1-0 of for formats 0-1 and 1-1.
    formats                ENUMERATED   {formats0-
0-And-1-0, fomats0-1-And-1-1}, ...
    }
```

According to configuration information, the base station may configure one or a plurality of search space sets for the UE. The base station may configure search space set 1 and search space set 2 for the UE, and may configure the UE to monitor DCI format A scrambled with an X-RNTI in search space set 1 in a common search space and to monitor DCI format B scrambled with a Y-RNTI in search space set 2 in a UE-specific search space.

According to configuration information, one or a plurality of search space sets may exist in a common search space or a UE-specific search space. For example, search space set 1 and search space set 2 may be configured as a common search space, and search space set 3 and search space set 4 may be configured as a UE-specific search space.

In a common search space, the following combinations of a DCI format and an RNTI may be monitored. However, the disclosure is not limited to the following examples.

DCI format 0_0/1_0 with CRC scrambled by C-RNTI, configured scheduling RNTI (CS-RNTI), semi-persistent CSI RNTI (SP-CSI-RNTI), RA-RNTI, temporary cell RNTI (TC-RNTI), P-RNTI, SI-RNTI DCI format 2_0 with CRC scrambled by SFI-RNTI DCI format 2_1 with CRC scrambled by interruption RNTI (INT-RNTI)

DCI format 2_2 with CRC scrambled by TPC-PUSCH-RNTI, TPC-PUCCH-RNTI

DCI format 2_3 with CRC scrambled by TPC sounding reference signal RNTI (TPC-SRS-RNTI)

In a UE-specific search space, the following combinations of a DCI format and an RNTI may be monitored. However, the disclosure is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow the following definitions and uses.

(C-RNTI: For scheduling of UE-specific PDSCH

TC-RNTI: For scheduling of UE-specific PDSCH

CS-RNTI: For scheduling of semi-statically configured UE-specific PDSCH

RA-RNTI: For scheduling of PDSCH in random access process

P-RNTI: For scheduling of PDSCH for paging transmission

SI-RNTI: For scheduling of PDSCH for system information transmission

INT-RNTI: For indicating whether PDSCH is punctured
TPC-PUSCH-RNTI: For indicating power control command for PUSCH
TPC-PUCCH-RNTI: For indicating power control command for PUCCH
TPC-SRS-RNTI: For indicating power control command for SRS The DCI formats specified above may be defined as set forth in Table 11 below.

TABLE 11

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, a search space according to CORESET p, search space set s, and aggregation level L may be represented by Equation (1) below.

$$L \cdot \left\{ \left( Y_{p,n_{sf}^\mu} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \quad (1)$$

L: Aggregation level
$n_{CI}$: Carrier index
$N_{CCE,p}$: Total number of CCEs present in CORESET p
$n_{s,f}^\mu$: Slot index
$M_{p,s,max}^{(L)}$: Number of PDCCH candidates in aggregation level L
$m_{s,n_{CI}}=0, \ldots, M_{p,s,max}^{(L)}-1$: PDCCH candidate index in aggregation level L
$i=0, \ldots, L-1$
$Y_{p,n_{s,f}^\mu}=(A_p \cdot YY_{p,n_{s,f}^\mu-1}) \bmod D$, $P_{p-1}=n_{RNTI}$, $A_0=39827$, $A_1=39829$, $A_2=39839$, $D=65537$
$n_{RNTI}$: UE identity
$Y\_(p,n_{s,f}^\mu)$ may correspond to 0 in a common search space.
$Y\_(p,n_{s,f}^\mu)$ may correspond to a value changing according to a UE identity (C-RNTI or ID configured by the base station for the UE) and a time index in a UE-specific search space.

In 5G, as a plurality of search space sets may be configured with different parameters (e.g., the parameters in Table 10a and Table 10b), the UE may monitor a different set of search space sets at each time. For example, when search space set 1 is configured according to an X-slot period, search space set 2 is configured according to a Y-slot period, and X and Y are different, the UE may monitor both search space set 1 and search space set 2 in a specific slot and may monitor one of search space set 1 and search space set 2 in a specific slot.

When a plurality of search space sets is configured for the UE, the following conditions may be considered in a method for determining a search space set to be monitored by the UE.

Condition 1: Limitation on Maximum Number of PDCCH Candidates

The number of PDCCH candidates to be monitored per slot does not exceed $M^\mu$. $M^\mu$ may be defined as the maximum number of PDCCH candidates per slot in a cell configured with a subcarrier spacing of $15 \cdot 2^\mu$ kHz, which is set forth in Table 12 below.

TABLE 12

| μ | Maximum number of PDCCH candidates per slot and per serving cell ($M^\mu$) |
| --- | --- |
| 0 | 44 |
| 1 | 36 |
| 2 | 22 |
| 3 | 20 |

Condition 2: Limitation on Maximum Number of CCEs

The number of CCEs forming all search spaces per slot does not exceed $C^\mu$. Here, all search spaces refers to all CCE sets corresponding to a union region of a plurality of search space sets. $C^\mu$ may be defined as the maximum number of CCEs per slot in a cell configured with a subcarrier spacing of $15 \cdot 2^\mu$ kHz, which is set forth in Table 13 below.

TABLE 13

| μ | Maximum number of CCEs per slot, and per serving cell ($C^\mu$) |
| --- | --- |
| 0 | 56 |
| 1 | 56 |
| 2 | 48 |
| 3 | 32 |

For convenience of explanation, a situation in which both condition 1 and condition 2 are satisfied at a specific time is defined as condition A. Therefore, not satisfying condition A may mean not satisfying at least one of condition 1 and condition 2.

A case may exist in which condition A is not satisfied at a specific time depending on a configuration of search space sets by the base station. When condition A is not satisfied at the specific time, the UE may select and monitor only some of search space sets configured to satisfy condition A at the time, and the base station may transmit a PDCCH via the selected search space sets.

The following method may be used for selecting some search spaces from among all configured search spaces.

This first method is for when condition A for a PDCCH is not satisfied at a specific time (slot)

The UE (or the base station) may preferentially select a search space set of which a search space type is configured as a common search space from among search space sets existing at the time over a search space set configured as a UE-specific search space.

When all search space sets configured as common search spaces are selected (i.e., when condition A is satisfied even after all search spaces configured as common search spaces are selected), the UE may select search space sets configured as UE-specific search spaces. Here, when there is a plurality of search space sets configured as UE-specific search spaces, a search space set having a lower search space set index may have a higher priority. The UE-specific search space sets may be selected in consideration of priorities within a range in which condition A is satisfied.

In 5G, a CORESET may include $N_{RB}^{CORESET}$ RBs in the frequency domain and may include $N_{symb}^{CORESET} \in \{1, 2, 3\}$ symbols on the time axis. One CCE may include six REGs, and an REG may be defined as one RB for one OFDM symbol. In one CORESET, the REGs may be indexed in a time-first order by starting to provide an REG index of 0 for a lowest RB in an initial OFDM symbol of the CORESET.

In 5G, an interleaving method and a non-interleaving method are supported as PDCCH transmission methods. The base station may configure whether interleaved or non-interleaved transmission is performed per CORESET for the UE via higher-layer signaling. Interleaving may be performed in REG bundles. An REG bundle may be defined as one or a plurality of REG sets. The UE may determine a CCE-to-REG mapping method for a CORESET as set forth in Table 13-1 based on interleaved or non-interleaved transmission configured by the base station.

TABLE 13-1

The CCE-to-REG mapping for a control-resource set can be interleaved or non-interleaved and is described by REG bundles:
- REG bundle i is defined as REGs $\{iL, iL+1, \ldots, iL+L-1\}$ where L is the REG bundle size, $i = 0, 1, \ldots, N_{REG}^{CORESET}/L - 1$, and $N_{REG}^{CORESET} = N_{RB}^{CORESET} N_{symb}^{CORESET}$ is the number of REGs in the CORESET
- CCE j consists of REG bundles $\{f(6j/L), f(6j/L+1), \ldots, f(6j/L+6/L-1)\}$ where $f(\bullet)$ is an interleaver
  For non-interleaved CCE-to-REG mapping, $L = 6$ and $f(x) = x$.
  For interleaved CCE-to-REG mapping, $L \in (2,6)$ for $N_{symb}^{CORESET} = 1$ and $L \in \{N_{symb}^{CORESET}, 6\}$ for $N_{symb}^{CORESET} \in \{2,3\}$.
  The interleaver is defined by
  $f(x) = (rC + c + n_{shift}) \mod (N_{REG}^{CORESET}/L)$
  $x = cR + r$
  $r = 0, 1, \ldots, R - 1$
  $c = 0, 1, \ldots, C - 1$
  $C = N_{REG}^{CORESET}/(LR)$
  where $R \in \{2,3,6\}$.

Figure 6:
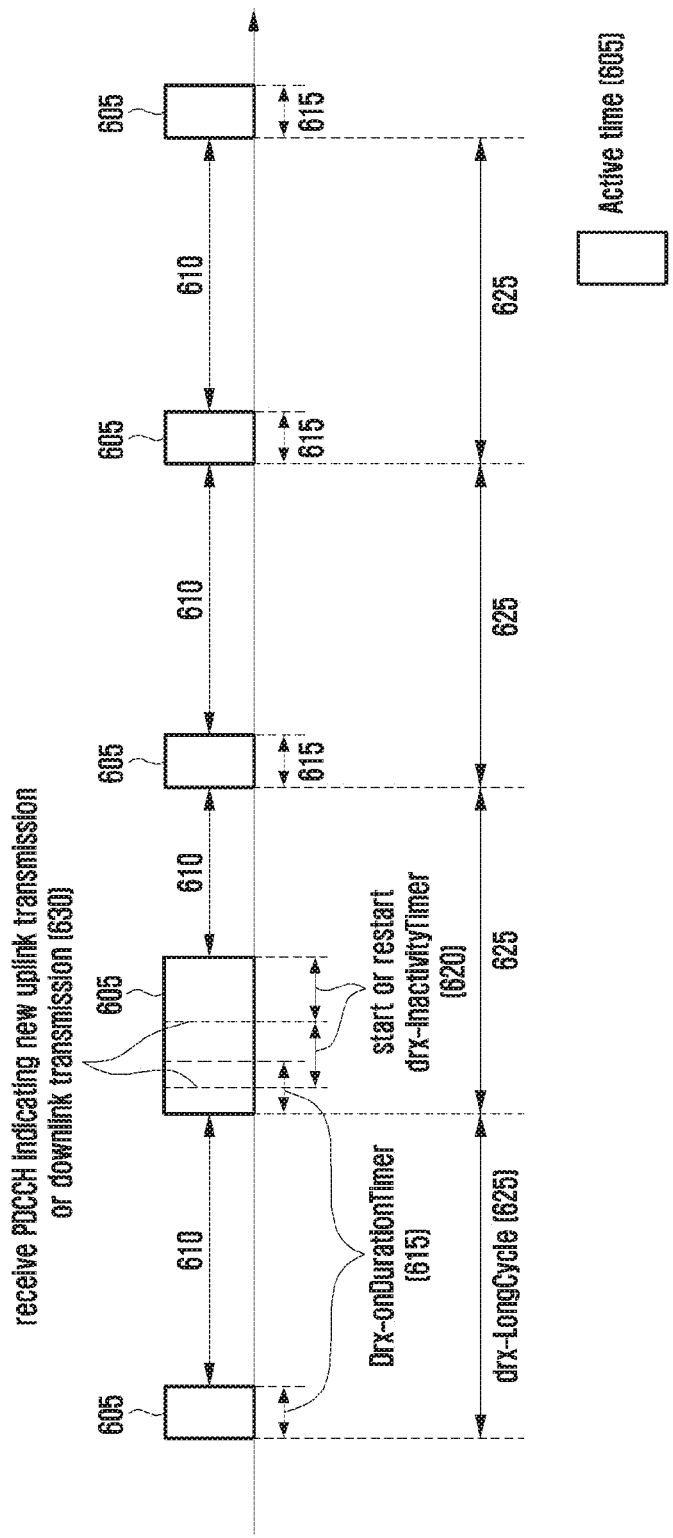
FIG. 6 is a diagram illustrating an example of discontinuous reception (DRX) operation in 5G.

FIG. 6 is a diagram illustrating DRX.

DRX is an operation in which a UE using a service discontinuously receives data in an RRC connected state in which a radio link is established between a base station and the UE. When DRX is applied, the UE may turn on a receiver at a specific time to monitor a control channel, and may turn off the receiver to reduce power consumption of the UE when there is no data received for a certain period. DRX may be controlled by a MAC-layer device based on various parameters and timers.

Referring to FIG. 6, an active time 605 is a time in which the UE wakes up and monitors a PDCCH according to a DRX cycle. The active time 605 may be defined as follows:
  drx-onDurationTimer or drx-InactivityTimer or drx-RetransmissionTimerDL or drx-RetransmissionTimerUL or ra-ContentionResolutionTimer is running; or
  a scheduling request is sent on PUCCH and is pending; or
  a PDCCH indicating a new transmission addressed to the C-RNTI of the MAC entity has not been received after successful reception of a random access response to a random access preamble not selected by the MAC entity among the contention-based random access preambles.

drx-onDurationTimer, drx-InactivityTimer, drx-RetransmissionTimerDL, drx-RetransmissionTimerUL, and ra-ContentionResolutionTimer are timers whose values are configured by the base station and have a function of configuring the UE to monitor a PDCCH when a predetermined condition is satisfied.

drx-onDurationTimer 615 is a parameter for configuring a minimum time for which the UE is awake in the DRX cycle. drx-InactivityTimer 620 is a parameter for configuring a time for which the UE is additionally awake when receiving a PDCCH indicating new uplink transmission or downlink transmission 630. drx-RetransmissionTimerDL is a parameter for configuring a maximum time for which the UE is awake in order to receive downlink retransmission in a downlink hybrid automatic repeat request (HARQ) process. drx-RetransmissionTimerUL is a parameter for configuring a maximum time for which the UE is awake in order to receive an uplink retransmission grant in an uplink HARQ process. drx-onDurationTimer, drx-InactivityTimer, drx-RetransmissionTimerDL, and drx-RetransmissionTimerUL may be set to, for example, time, the number of subframes, the number of slots, or the like. ra-ContentionResolutionTimer is a parameter for monitoring a PDCCH in a random access process.

An inactive time 610 is a time configured during which a PDCCH is not monitored and/or a time configured during which a PDCCH is not received during a DRX operation and may be remaining time excluding the active time 605 from a total time to perform the DRX operation. When the UE does not monitor a PDCCH during the active time 605, the UE may enter a sleep or inactive state to reduce power consumption.

The DRX cycle refers to a period in which the UE wakes up and monitors a PDCCH. That is, the DRX cycle refers to an interval from a time when the UE monitors a PDCCH to a time when the UE monitors a next PDCCH or a period in which on-duration occurs. There are two types of DRX cycles, including a short DRX cycle and a long DRX cycle. A short DRX cycle may be optionally applied.

A long DRX cycle 625 is a long cycle of two DRX cycles configured for the UE. While operating according to the long DRX cycle, the UE starts drx-onDurationTimer 615 again at a time after the long DRX cycle 625 from the starting point (e.g., starting symbol) of drx-onDurationTimer 615. When operating according to the long DRX cycle 625, the UE may start drx-onDurationTimer 615 in a slot after drx-SlotOffset from a subframe that satisfies Equation (2) below. Here, drx-SlotOffset refers to a delay before drx-onDurationTimer 615 is started. drx-SlotOffset may be set to, for example, time, the number of slots, or the like.

$$[(SFN \times 10) + subframe\ number] modulo(drx\text{-}LongCycle) = drx\text{-}StartOffset \quad (2)$$

Here, drx-LongCycleStartOffset may be used to define the long DRX cycle 625, and drx-StartOffset may be used to define a subframe at which the long DRX cycle 625 starts. drx-LongCycleStartOffset may be set to, for example, time, the number of subframes, the number of slots, or the like.

Hereinafter, a method for configuring a TC state for a PDCCH (or PDCCH DMRS) in a 5G communication system will be described in detail.

A base station can configure and indicate a TC state for a PDCCH (or PDCCH DMRS) through appropriate signaling. According to the above description, the base station can configure and indicate a TCI state for a PDCCH (or PDCCH DMRS) through appropriate signaling. The TCI state is for reporting a QCL relationship between the PDCCH (or PDCCH DMRS) and a different RS or channel, and a reference antenna port A (reference RS A) being QCLed with another target antenna port B (target RS B) means that a UE is allowed to apply some or all of large-scale channel parameters estimated from the antenna port A to channel measurement from the antenna port B.

QCL may need to associate different parameters depending on situations, such as 1) time tracking affected by an average delay and delay spread, 2) frequency tracking affected by Doppler shift and Doppler spread, 3) radio resource management (RRM) affected by an average gain, and 4) beam management (BM) affected by a spatial parameter. Accordingly, NR supports four types of QCL relationships set forth below in Table 14.

TABLE 14

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial RX parameter may collectively refer to some or all of various parameters, such as the angle of arrival (AoA), the power angular spectrum (PAS) of AoA, the angle of departure (AoD), the PAS of AoD, a transmit/receive channel correlation, transmit/receive beamforming, a spatial channel correlation, and the like.

A QCL relationship may be configured for the UE through RRC parameters, such as TCI-State and QCL-Info, as shown below in Table 15. Referring to Table 15, the base station may configure at least one TCI state for the UE, thereby notifying the UE of up to two QCL relationships (gel-Type1 and qcl-Type2) with an RS referring to the ID of the TCI state, that is, a target RS. Here, individual QCL information (QCL-Info) included in each TCI state includes the serving cell index and BWP index of the reference RS indicated by the QCL: information, the type and ID of the reference RS, and a QCL type illustrated in Table 14.

that is, different beams. Specifically, TCI state combinations applicable to a PDCCH DMRS antenna port are set forth below in Table 16. In Table 16, a fourth row is a combination assumed by the HE before RRC configuration and is impossible to be configured RRC.

TABLE 16

| Valid TCI state Configuration | DL RS 1 | qcl-Type1 | DL RS 2 (if configured) | qcl-Type 2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
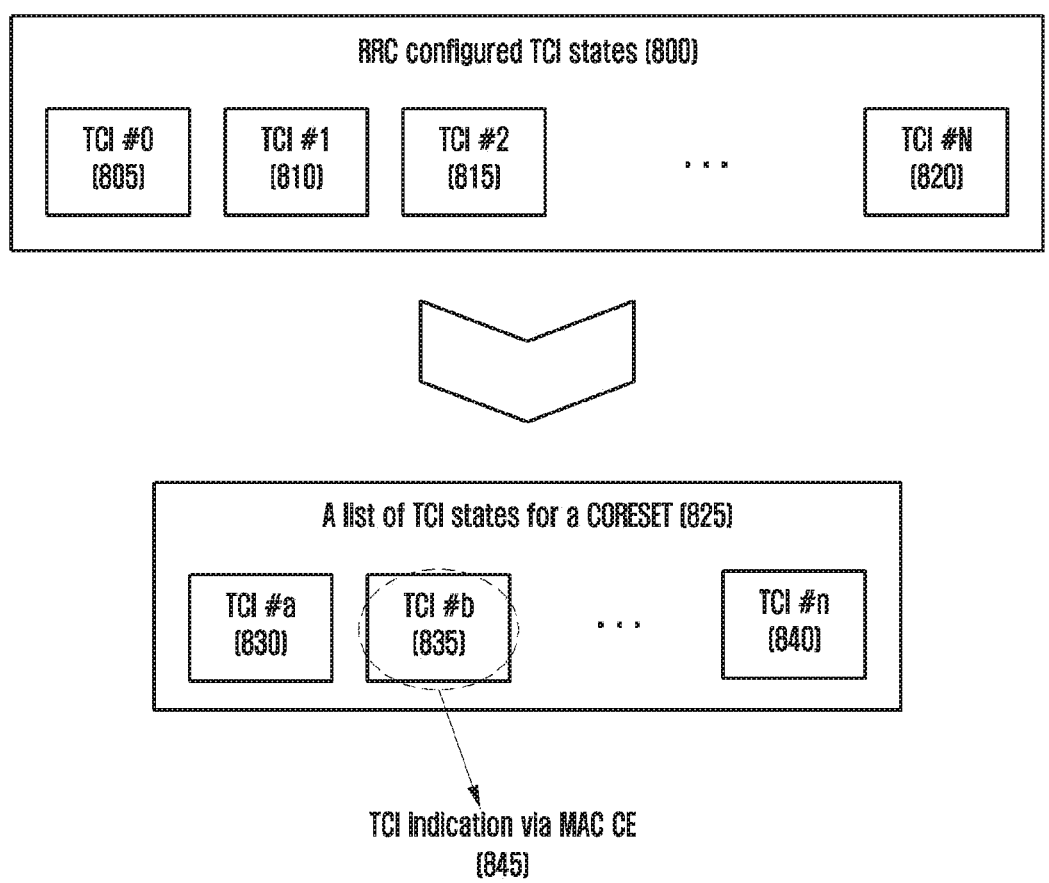
FIG. 8 is a diagram illustrating an example of a TCI state allocation method for a PDCCH in 5G.

In NR, a hierarchical signaling method as illustrated in FIG. 8 is supported for dynamic allocation of a PDCCH beam. Referring to FIG. 8, a base station may configure N TCI states 805, 810, 815, . . . , 820 for a UE through RRC signaling 800 and may configure some of the TCI states as TCI states for a CORESET 825. The base station may indicate one of the TCI states 830, 835, and 840 for the CORESET to the UE through MAC CE signaling 845. Subsequently, the UE receives a PDCCH based on beam information included in the TCI state indicated by the MAC CE signaling.

Figure 9:
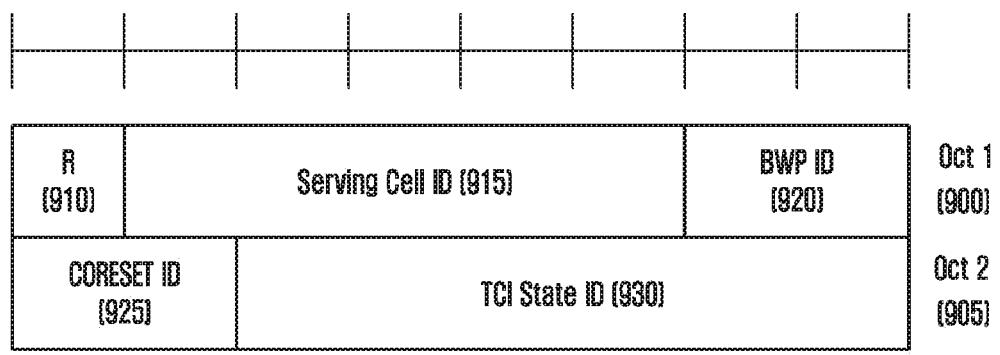
FIG. 9 is a diagram illustrating a TC indication medium access control (MAC) control element (CE) signaling structure for a PDCCH demodulation reference signal (DMRS) in 5G.

FIG. 9 is a diagram illustrating a TCI indication MAC CE signaling structure for a PDCCH DMRS. Referring to FIG.

TABLE 15

```
TCI-State ::=                    SEQUENCE {
    tci-StateED              TCI-StateId,
         (ID of corresponding TCI state)
    gcl-Type1                QCL-Info,
         (QCL information about first reference RS of RS referring to corresponding TCI state ID (target
RS))
    gcl-Type2                QCL-Info         OPTIONAL, -- Need R
         (QCL information about second reference RS of RS referring to
corresponding TCI state ID (target RS))
    ...
}
}
QCL-Info::=                  SEQUENCE {
    cell              ServCellIndex          OPTIONAL,    -- Need R
         (Serving cell index of reference RS indicated by corresponding QCL
information)
    Bwp-Id            BWP Id          OPTIONAL,   -- Cond CSI-RS-Indicated
         (BWP index of reference RS indicated by corresponding QCL information)
    referenceSignal                   CHOICE {
         csi-rs                       NZP-CSI-RS-ResourceId,
         ssb                          SSB-Index
             (Either CSI-RS ID or SSB ID indicated by corresponding QCL information)
    }
    qcl-Type                          ENUMERATED {typeA, typeB, type C, typeD},
    ...
}
```

Figure 7:
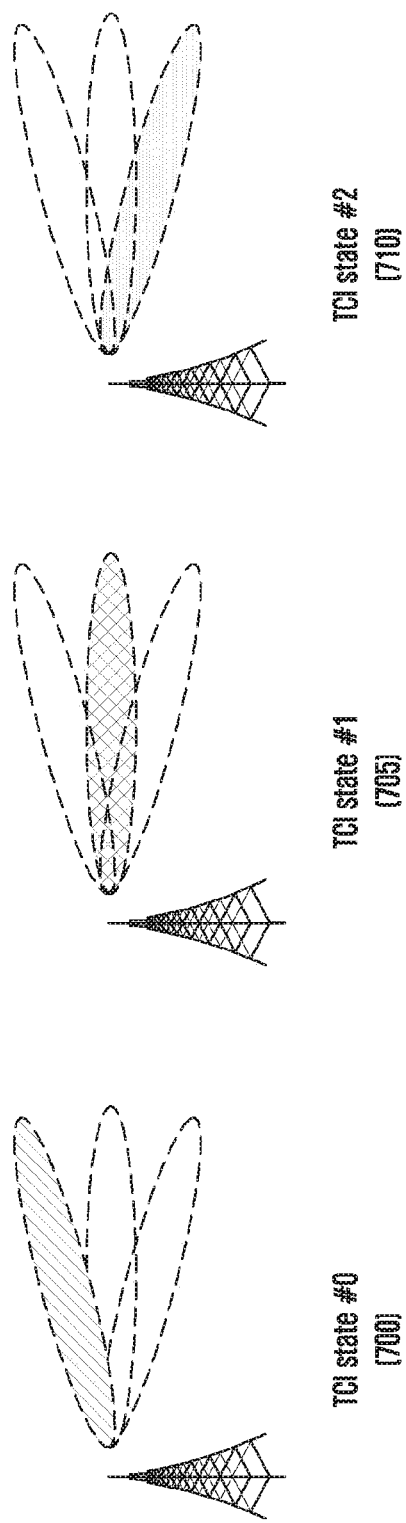
FIG. 7 is a diagram illustrating an example of beam allocation by a base station according to a transmission configuration indicator (TCI) state configuration in 5G.

FIG. 7 is a diagram illustrating an example of beam allocation by a base station according to a TCI state configuration. Referring to FIG. 7, a base station may transmit pieces of information about N different beams to a LIE through N different TCI states.

For example, as illustrated in FIG. 7, when N=3, the base station may associate qcl-Type2 parameters included in three TCI states 700, 705, and 710 with CSI-RSs or SSBs corresponding to different beams and may configure the qcl-Type2 parameters as QCL type D, thereby reporting that antenna ports referring to the different TCI states 700, 705, or 710 are associated with different spatial Rx parameters,

9, TCI indication MAC CE signaling for the PDCCH DMRS includes two bytes (16 bits) and includes a reserved bit 910 of one bit, a five-bit serving cell ID 915, a two-bit BWP ID. 920 in octet 1900, and includes a two-bit CORESET ID 925, and a six-bit TCI state ID 930 in octet 2 905.

Figure 10:
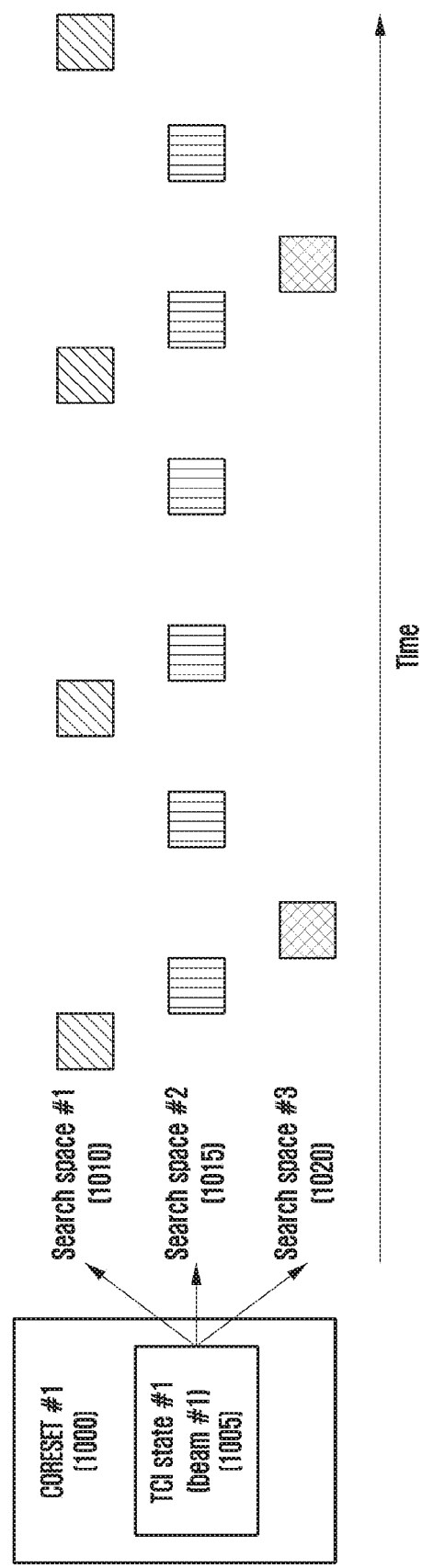
FIG. 10 is a diagram illustrating an example of a PDCCH configuration in 5G.

FIG. 10 is a diagram illustrating an example of configuring a CORESET and a search space beam. Referring to FIG. 10, a base station may indicate one of TCI state lists included in a configuration of a CORESET 1000 through MAC CE signaling 1005. A UE considers that the same QCL information (beam #1) 1005 is applied to one or more search spaces 1010, 1015, and 1020 connected to the CORESET until a different TCI state is indicated to the CORESET through another MAC CE signaling. In the above-described PDCCH beam allocation method, it is difficult to indicate a beam change earlier than a MAC CE signaling delay and the same beam is equally applied to separate CORESETs regardless of characteristics of search spaces, making it difficult to flexibly mange PDCCH beams.

Hereinafter, embodiments provide a method for flexibly configuring and managing a PDCCH beam. In describing the embodiments, a plurality of separate examples is provided for convenience of description, but these examples are not mutually exclusive and may be appropriately combined and applied according to circumstances.

A base station may configure one or a plurality of TCI states for a specific CORESET for a UE, and may activate one of the configured TCI states through a MAC CE activation command. For example, {TCI state #0, TCI state #1, TCI state #2} is configured as TCI states for CORESET #1, and the base station may transmit an activation command to assume TCI state #0 as a TCI state for CORESET #1 to the UE through a MAC CE. The UE may properly receive a DMRS of the CORESET based on QCL information in the activated TC state according to the activation command for the TCI state received via the MAC CE.

For a CORESET (CORESET #0) with an index set to 0, when the UE fails to receive a MAC CE activation command for a TCI state for CORESET #0, the UE may assume that a DMRS transmitted via CORESET #0 is QCLed with an SS/PBCH block identified in an initial access process or in a non-contention-based random access process not triggered by a PDCCH command.

For a CORESET (CORESET #X) with an index set to a value other than 0, when the UE is not allocated a TCI state for CORESET #X or is allocated one or more TCI states but fails to receive a MAC CE activation command to activate one of the TCI states, the UE may assume that a DMRS transmitted via CORESET #X is QCLed with an SS/PBCH block identified in an initial access process.

Although embodiments of the disclosure are described with reference to a 5G system as an example, these embodiments of the disclosure may also be applied to other communication systems having a similar technical background or channel form. For example, LTE or LTE-A mobile communication systems and post-5G mobile communication technology may be included in these systems. Therefore, the embodiments of the disclosure may be partially modified and applied to other communication systems by a person skilled in the art without departing from the scope of the disclosure.

Hereinafter, in describing the disclosure, higher-layer signaling may be signaling according to at least one of the following signals or a combination of one or more thereof.
  MIB
  SIB or SIB X (X=1, 2, . . . )
  RRC
  MAC CE Further, L1 signaling may be signaling according to at least one of signaling methods using the following physical channels or signals or a combination of one or more thereof.
  PDCCH
  DCI
  UE-specific DCI
  Group-common DCI
  Common DCI
  Scheduling DCI (e.g., DCI used for scheduling downlink or uplink data)
  Non-scheduling DCI (e.g., DCI not used for scheduling downlink or uplink data)
  PUCCH
  Uplink control information (UCI)

In 5G, a CORESET may include $N_{RB}^{CORESET}$ RBs in the frequency domain and may include $N_{symb}^{CORESET} \in \{1, 2, 3\}$ symbols on the time axis. One CCE may include six REGs, and an REG may be defined as one RB for one OFDM symbol. In one CORESET, the REGs may be indexed in a time-first order by starting to provide an REG index of 0 for a lowest RB in an initial OFDM symbol of the CORESET.

According to the foregoing PDCCH structure in 5G, a PDCCH is limited to up to three symbols. Thus, when a bandwidth for transmitting the PDCCH is narrow, time and frequency resources for transmitting the PDCCH may not be sufficiently secured, which may not be favorable for PDCCH reception quality or PDCCH coverage.

For example, 5G may support a low-cost UE, and the low-cost UE may have characteristics, such as a narrower bandwidth, a smaller number of antennas, and a longer processing time than those for a conventional UE. In this case, when transmission is performed using the current 5G PDCCH structure, coverage may not be sufficiently satisfied as described above. Therefore, the existing PDCCH structure needs to be improved so that the 5G base station supports the low-cost UE. In addition to this example, it may be required to improve PDCCH coverage in 5G for various reasons.

In one embodiment, a flexible symbol length may be supported in configuring a CORESET for PDCCH transmission. That is, a symbol length for a CORESET is limited to up to three symbols in a related art, while a PDCCH structure proposed in the disclosure may support not only one, two, or three symbols, but also a configuration of arbitrary N symbols greater than three symbols. As a symbol length for a CORESET is increased, the amount of time and frequency resources available for PDCCH transmission within the same bandwidth may be increased, and accordingly PDCCH reception quality or PDCCH coverage may be improved.

Hereinafter, various PDCCH structures are proposed through various embodiments.

A first embodiments includes a transmission method using multiple CORESETs One PDCCH may be transmitted from a base station to a UE through one CORESET or a plurality of CORESETs.

Figure 11:
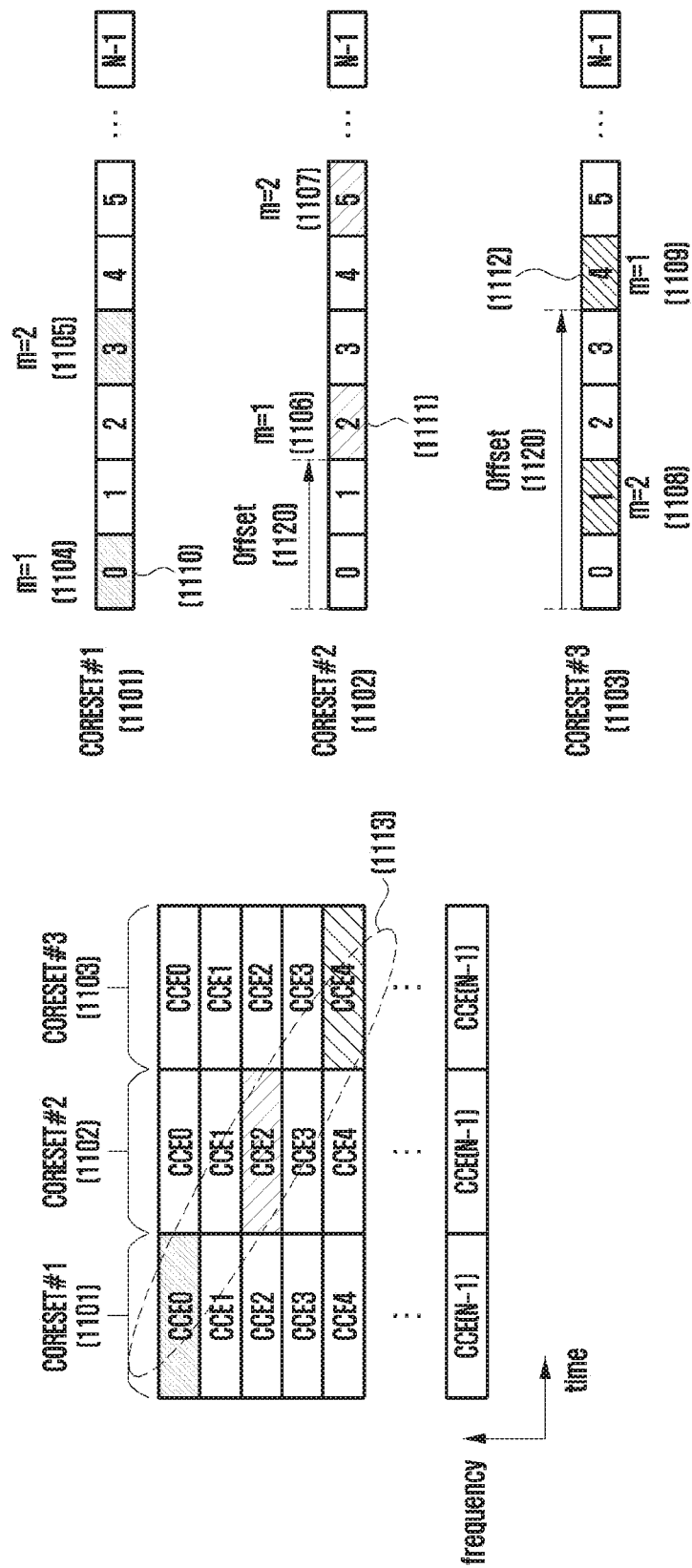
FIG. 11 is a diagram illustrating a PDCCH transmission method, according to embodiment of the disclosure.

FIG. 11 is a diagram illustrating a PDCCH transmission method, according to an embodiment of the disclosure. One PDCCH 1113 is transmitted through three CORESETs 1101, 1102, and 1103.

A base station may configure N CORESETs for a UE via higher-layer signaling. In addition, the base station may notify the UE whether a PDCCH is transmitted through each CORESET among the N configured CORESETs ("PDCCH mode A") or is transmitted through the N CORESETs ("PDCCH mode B").

When PDCCH mode A is configured, the UE may perform blind decoding on each configured CORESET and may receive one PDCCH within each CORESET. When PDCCH mode B is configured, the UE may perform blind decoding on all of the N configured CORESETs and may receive one PDCCH through the N CORESETs.

There may be various methods for the base station to notify the UE of PDCCH mode A or PDCCH mode B. For example, it is possible to explicitly configure PDCCH mode A or PDCCH mode B via higher-layer signaling or to implicitly report PDCCH mode A or PDCCH mode B based on a different system parameter value (e.g., CORESET configuration information or search space-related configuration information).

The following methods may be used for reporting PDCCH mode B.

To transmit or receive one PDCCH through the N CORESETs, one search space configuration may be associated with a plurality of CORESETs. To this end, a CORESET ID reference field in the search space configuration may refer to a plurality of CORESET IDs. For example, search space #1 may be associated with CORESET #1, CORESET #2, and CORESET #3.

In this case, according to a method of determining a monitoring occasion in each CORESET associated with one search space, a monitoring occasion within a slot of each CORESET may be determined, for example, based on information configured with a monitoring symbols-within-slot (monitoringSymbolsWithinSlot) parameter in the search space configuration. For example, each CORESET may be monitored at a symbol position indicated by the monitoringSymbolsWithinSlot parameter. The monitoringSymbolsWithinSlot parameter may correspond to a parameter that determines a monitoring occasion in symbols in a slot of the search space, and may provide position information about a monitoring occasion in the slot, for example, via a 14-bit bitmap. For example, when search space #1 is associated with CORESET #1, CORESET #2, and CORESET #3, and a bitmap [10 10 10 0 0 0 0 0 0 0 0] is configured with the monitoringSymbolsWithinSlot parameter (where each bit of the bitmap may be mapped to each symbol in the slot), CORESET #1 may be monitored in a first symbol in the slot, CORESET #2 may be monitored in a third symbol in the slot, and CORESET #3 may be monitored in a fifth symbol in the slot.

The base station may refer to a plurality of CORESET IDs when configuring a search space for the UE, and may report a series of setting values for the monitoringSymbolsWithinSlot parameter in order to determine a monitoring occasion for each CORESET. The UE may receive CORESET configuration information and search space configuration information from the base station. Here, the UE may receive configuration information referring to a plurality of CORESET IDs as part of the search space configuration information. In addition, the UE may receive a setting value for the monitoringSymbolsWithinSlot parameter as part of the search space configuration information from the base station, and may determine a monitoring occasion of a plurality of CORESETs associated with the search space based on the configuration information.

In another method for, PDCCH transmission or reception according to PDCCH mode B, the base station may configure a CORESET group including a plurality of CORESETs for transmitting one PDCCH for the UE. For example, the base station may configure, for the UE, a CORESET group including a plurality of CORESETs for PDCCH transmission based on PDCCH mode B, for example, (CORESET #1, CORESET #2, CORESET #3), and may transmit a random PDCCH to the UE through the CORESETs in the CORESET group, that is, CORESET #1, CORESET #2, and CORESET #3. The UE may be allocated a CORESET group for PDCCH transmission based on PDCCH mode B from the base station, may monitor a PDCCH in a plurality of CORESETs in the CORESET group, and may receive the PDCCH through the plurality of CORESETs.

In a method of transmitting a PDCCH through a plurality of CORESETs, according to one embodiment, when one PDCCH is transmitted through CCEs of a plurality of CORESETs, CCE indexes used for PDCCH transmission in the respective CORESETs may be the same or different. For example, one PDCCH may be transmitted through CCE0 of CORESET #1 1101, CCE0 of CORESET #2 1102, and CCE0 of CORESET #3 1103. Alternatively, as illustrated in FIG. 11, one PDCCH may be mapped to and transmitted through CCE0 of CORESET #1 1101, CCE2 of CORESET #2 1102, and CCE4 of CORESET #3 1103 (1113).

In a method of transmitting a PDCCH through a plurality of CORESETs, one PDCCH may be mapped to and transmitted through a set of PDCCH candidates having the same PDCCH candidate index among PDCCH candidates forming a search space in each CORESET.

FIG. 11 illustrates an example of a search space configuration assuming AL=1 in CORESET #1 1101, CORESET #2 1102, and CORESET #3 1103.

In a search space of CORESET #1 1101 in FIG. 11, an m=1 (1104) PDCCH candidate is allocated to CCE #0 in CORESET #1 1101, and an m=2 (1105) PDCCH candidate is allocated to CCE #3 in CORESET #1 1101. In a search space of CORESET #2 1102 in FIG. 11, an m=1 (1106) PDCCH candidate is allocated to CCE #2 in CORESET #2 1102, and an m=2 (1107) PDCCH candidate is allocated to CCE #5 in CORESET #2 1102. In a search space of CORESET #3 1103 in FIG. 11, an m=2 (1108) PDCCH candidate is allocated to CCE #1 in CORESET #3 1103, and an m=1 (1109) PDCCH candidate is allocated to CCE #4 in CORESET #3 1103.

In this case, one PDCCH may be transmitted through PDCCH candidates having the same index in the search spaces of the respective CORESETs. That is, one PDCCH may be transmitted using the m=1 PDCCH candidates of CORESET #1 1101, CORESET #2 1102, and CORESET #3 1103. In this case, the PDCCH may be transmitted through CCE #0 1110 of CORESET #1 1101, CCE #2 1111 of CORESET #2 1102, and CCE #4 1112 of CORESET #3 1103. When the PDCCH is transmitted in this manner, the PDCCH may be transmitted according to AL=3. That is, when one PDCCH is transmitted through M CORESETs and is transmitted through a search space corresponding to AL=L in each CORESET, this transmission may be considered to be the same as transmission of the PDCCH according to AL=M·L.

The base station may configure PDCCH mode B for the UE. When the UE is configured in PDCCH mode B, the UE may determine a search space based on the PDCCH transmission method and may perform blind decoding within the search space to detect a PDCCH. That is, the UE may determine a search space corresponding to AL=L configured in each CORESET and may determine the position of an mth PDCCH candidate in the search space in each CORESET or a set of CCEs forming the PDCCH candidate.

For example, it may be assumed that one PDCCH may be transmitted via a set of PDCCH candidates (PDCCH candidates A) existing in different CORESETs and having the same index of m. Further, in one example, a set of CCEs forming the set of PDCCH candidates existing in the different CORESETs and having the index of m may be considered as one PDCCH candidate (PDCCH candidate B). The UE may perform blind decoding on a search space including a set of PDCCH candidates B in a plurality of CORESETs, thereby detecting a PDCCH.

Furthermore, in an embodiment, the base station may additionally configure, report, or indicate an offset 1120, $\Delta_{offset}$, for adjusting the starting point of a search space in each CORESET. The UE may determine a search space in each CORESET based on the configured offset 1120. For example, in a method of determining $Y\_(p,n^\mu_{s,f})$ in Equation (1) illustrated above, the offset 1120 may be additionally considered. Specifically, as illustrated in Equation (3) below, the offset 1120 may be additionally applied to $Y\_(p,n^\mu_{s,f})$.

$$Y\_(p,n^\mu_{s,f}) = (Y\_(p,n^\mu_{s,f}) + \Delta_{offset}) \bmod D \quad (3)$$

As described above, search spaces of a plurality of CORESETs for transmitting one PDCCH are configured to have different positions, thereby increasing the effect of diversity. For example, when the offset 1120 is not additionally applied to the search spaces in the respective CORESETs, the positions of PDCCH candidates having the same index (i.e., a set of CCE indexes forming an m=lth PDCCH) may be the same in the respective CORESETs.

For example, in the embodiment of FIG. 11, assuming that there is no offset 1120 for all CORESETs, all the m=1 PDCCH candidates may be allocated to CCE0, which may be ineffective in terms of diversity.

When offsets 1120 of different sizes are considered for the respective CORESETs, PDCCH candidates having the same index in the respective CORESETs may be allocated to different positions. For example, in the embodiment of FIG. 11, an offset 1120 of 2 is applied to CORESET #2 1102, and an offset 1120 of 4 is applied as to CORESET #3 1103. In this case, the m=1 PDCCH candidates in the respective CORESETs may include different sets of CCE indexes. For example, in FIG. 11, the m=1 PDCCH candidate in CORESET #1 1101 may include CCE0 1110, the m=1 PDCCH candidate in CORESET #2 1102 may include CCE2 1111, and the m=1 PDCCH candidate in CORESET #3 1103 may include CCE4 1112.

As described above, when one PDCCH is mapped to and transmitted via a set of a plurality of PDCCH candidates having the same index in search spaces in different CORESETs, the PDCCH may be transmitted via different CCEs in the respective CORESETs, thus obtaining a significant diversity gain.

The foregoing offset may be explicitly configured by the base station for the UE via higher-layer signaling. The offset may be configured for each CORESET or for each search space. Alternatively, the offset may be implicitly determined based on a different system parameter value (e.g., CORESET configuration information, search space-related configuration information, or a base station identifier, or a UE identifier). For example, the offset may be defined as a function of an CORESET index value. For example, an offset in an mth CORESET may be defined as $\Delta$ $\Delta_{offset}$=f(CORESET-ID)=a·CORESET-ID+b. f(·) may denote an arbitrary function, and a and b may be defined as arbitrary constants.

According to another embodiment, in 5G, a CORESET may include $N_R CO^{RESET}$ RBs in the frequency domain and may include $N_{symb}^{CORESET}$ {1, 2, 3} symbols on the time axis. One CCE may include six REGs, and an REG may be defined as one RB for one OFDM symbol. In one CORESET, the REGs may be indexed in a time-first order by starting to provide an REG index of 0 for a lowest RB in an initial OFDM symbol of the CORESET.

In a method of mapping an index to a REG in one CORESET, indexing may be performed in a time-first order and then in a frequency-second order in part of a time resource region in the CORESET. Subsequently, REG indexing may be repeated in the remaining time resource region according to a time-first frequency-second order.

Figure 12:
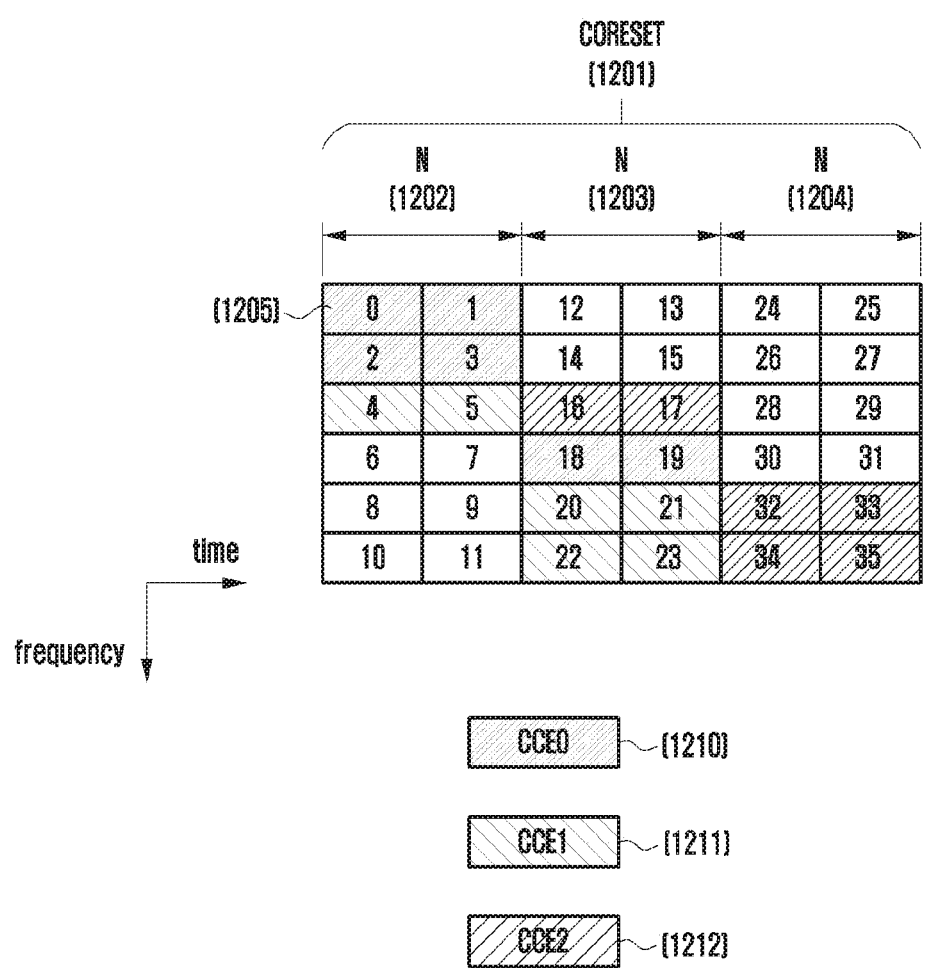
FIG. 12 is a diagram illustrating a PDCCH transmission method according to another embodiment of the disclosure.

FIG. 12 is a diagram illustrating a PDCCH transmission method, according to another embodiment of the disclosure.

A base station may configure a CORESET having a duration of arbitrary M symbols for a UE via higher-layer signaling, may index REGs 1205 within N symbols among the M symbols in a time-first order, and may then perform indexing in a frequency-second order when symbol N is reached. Subsequently, when a maximum RB index is reached, the base station may map indexes starting from a lowest RB index to REGs 1205 in symbol N+1 to symbol 2N in the time-first order and may then perform indexing in the frequency-second order when symbol 2N is reached. This REG mapping operation may be repeated until all REGs 1205 in the CORESET are indexed.

FIG. 12 shows a CORESET 1201 including six symbols on the time axis and six RBs on the frequency axis, in which it is assumed that N 1202, 1203 and 1204 have two symbols each. In the CORESET 1201, indexing REGs 1205 may start from a lowest RB in an initial symbol of the CORESET. Here, as described above, REGs within symbols 1, 2, . . . , N, that is, symbols 1 and 2, may be indexed first in a time-first frequency-second order. When an REG index reaches a maximum RB index of symbol N, REGs within symbols N+1, N+2, . . . , 2N, that is, symbols 3 and 4, may be indexed subsequently in the time-first frequency-second order. Likewise, when an REG index reaches a maximum RB index of symbol 2N, REGs within symbols 2N+1, 2N+2, . . . , 3N, that is, symbols 5 and 6, may be indexed subsequently in the time-first frequency-second order. The same operation may be repeated, thereby finally completing index mapping of all REGs in the CORESET.

The base station may explicitly configure the value of N for the UE via higher-layer signaling. One or more values may be configured for N. For the UE, N may be configured for each configured CORESET. The UE may be notified of the value of N from the base station, may determine the indexes of REGs in a CORESET by applying the foregoing REG index mapping method based on the received value of N, and may perform blind decoding based on the indexes. When the UE is not notified of the value of N from the base station, the UE may assume that N is a predefined default value or may consider that N is the same as the duration M of the CORESET.

In some embodiments, the value of N value may be implicitly determined based on a different system parameter value (e.g., CORESET configuration information, search space configuration information, or other configuration information about transmission and reception) or may be predefined by a system parameter. For example, the value of N may be determined based on a symbol duration value of a configured CORESET. When the configured CORESET has a symbol duration of M, N=ceil(M/T) or floor (M/T) may be defined. T may be a predefined fixed value or a value configured by the base station. In another example, the value of N may be determined as a predefined fixed value (e.g., 3).

The size of an REG bundle may be derived based on the value of N. For example, the size of the REG bundle may be the same as the value of N. Alternatively, the size of the REG bundle may be configured to be a size equal to N or a multiple of N. That is, one REG bundle may include N REGs. Referring to FIG. 12, when N=2, the size of an REG bundle may be 2, thus defining REG bundle #1={REG #0, REG #1}, REG bundle #2={REG #2, REG #3}, . . . , and the like.

When the base station configures an interleaving method as a PDCCH transmission method for the UE, interleaving may be performed in REG bundles. A specific interleaving method is set forth in Table 13-1. The embodiment of FIG. 12 shows an example of CCE-to-REG mapping when interleaving is applied.

In FIG. 12, CCE0 1210 includes {REG0, REG1, REG2, REG3, REG18, REG19}, CCE1 1211 includes {REG4, REG5, REG20, REG21, REG22, REG23}, and CCE2 1212 includes {REG16, REG17, REG32, REG33, REG34, REG35}. The UE may implicitly know the size of the REG bundle based on the configured value of N or may receive the size of the REG bundle configured by the base station via higher-layer signaling. When an interleaving method is configured, the UE may determine a search space in view of interleaving based on the determined REG bundle size and may detect a PDCCH through blind decoding in the search space.

Figure 13:
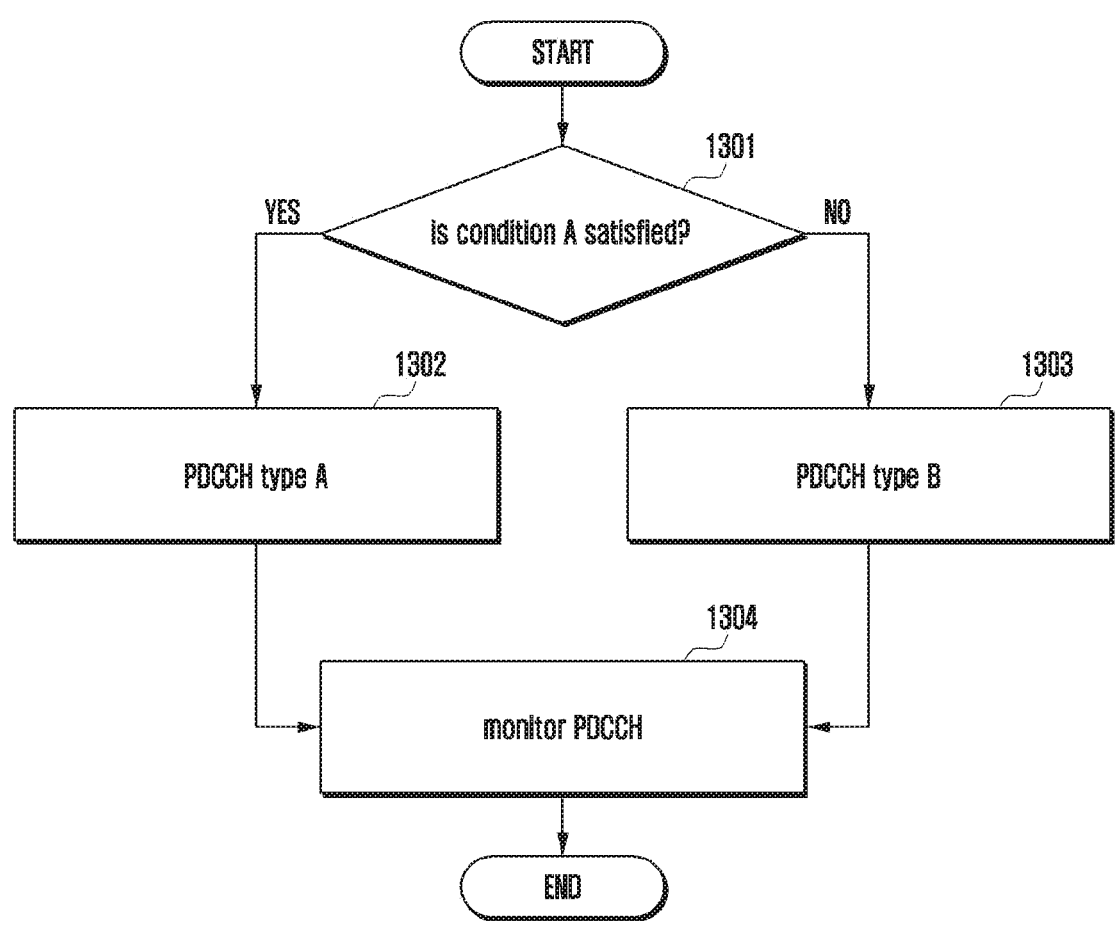
FIG. 13 is a diagram illustrating a user equipment (UE) operation, according to an embodiment of the disclosure.

FIG. 13 is a diagram illustrating a UE operation, according to an embodiment.

A UE determines whether condition A is satisfied, in operation 1301. When condition A is satisfied, the UE assumes PDCCH mode A, in operation 1302, and performs an operation of receiving a PDCCH based on PDCCH mode A, in operation 1304. When condition A is not satisfied, the UE assumes PDCCH mode B, in operation 1303, and performs an operation of receiving a PDCCH based on PDCCH mode B, in operation 1304.

Condition A may correspond to at least one of the following conditions or a combination of one or more of the following conditions.

- When a CORESET is configured with duration less than or equal to X symbols (e.g., X=3)
- When the UE is configured to monitor a DCI format for a specific use or traffic (e.g., when the UE is configured to monitor specific DCI format Y defined for use X, where use X is, for example, a different use other than eMBB, and the different use may correspond to, for example, a use for supporting a UE having lower performance than that of a UE corresponding to eMBB)
- When the UE is configured to operate in a specific transmission/reception mode (e.g., a transmission/reception mode other than a transmission/reception mode corresponding to eMBB, which may be, for example, a use for supporting a UE having lower performance than that of a terminal corresponding to eMBB)
- When PDCCH mode A is explicitly configured PDCCH mode A may correspond to a PDCCH transmission method satisfying at least one of the following details or a combination of one or more of the following details.

- Transmission mode according to a PDCCH structure and transmission method standardized in Release 15 NR
- Transmission mode in which one PDCCH is transmitted only within one CORESET
- PDCCH transmission mode in which a method for mapping REGs in a CORESET follows a time-first mapping method for all symbols configured as a CORESET
- PDCCH transmission mode in which one REG bundle includes a set of REGs existing across all symbols configured as a CORESET
- PDCCH transmission mode in which interleaving for a PDCCH is interleaving in the frequency domain PDCCH mode B may correspond to a PDCCH transmission method according to embodiment 1-1 or embodiment 1-2.

According to another embodiment, a base station may configure or indicate, to the UE, a specific time/frequency resource region corresponding to a rate matching resource via higher-layer signaling, L1 signaling, or a combination of higher-layer signaling and L1 signaling. When there is a time/frequency resource region of a control channel or data channel to be transmitted or received by the UE that entirely or partly overlaps the time/frequency resource region corresponding to the rate matching resource, the UE may perform at least one of the following methods or a combination of one or more of the following methods.

In a first method, the UE may transmit or receive the control channel or the data channel assuming that rate matching is performed on the control channel or the data channel in the overlapping region. That is, the UE may transmit or receive the control channel or the data channel assuming that the control channel or the data channel is mapped only to the entire resource region corresponding to the control channel or the data channel excluding the overlapping region.

In a second method, the UE may transmit or receive the control channel or the data channel by puncturing the control channel or the data channel in the overlapping region. That is, the UE may transmit or receive the control channel or the data channel assuming that the control channel or the data channel is mapped to the entire resource region corresponding to the control channel or the data channel but transmission is not performed in the overlapping region.

In a third method, when there is the overlapping region, the UE may not transmit or receive the entire control channel or data channel.

When there is a region overlapping with the rate matching resource, transmission and reception operations of the UE may be adjusted differently depending on the type of a physical-layer channel to be transmitted or received.

Figure 14:
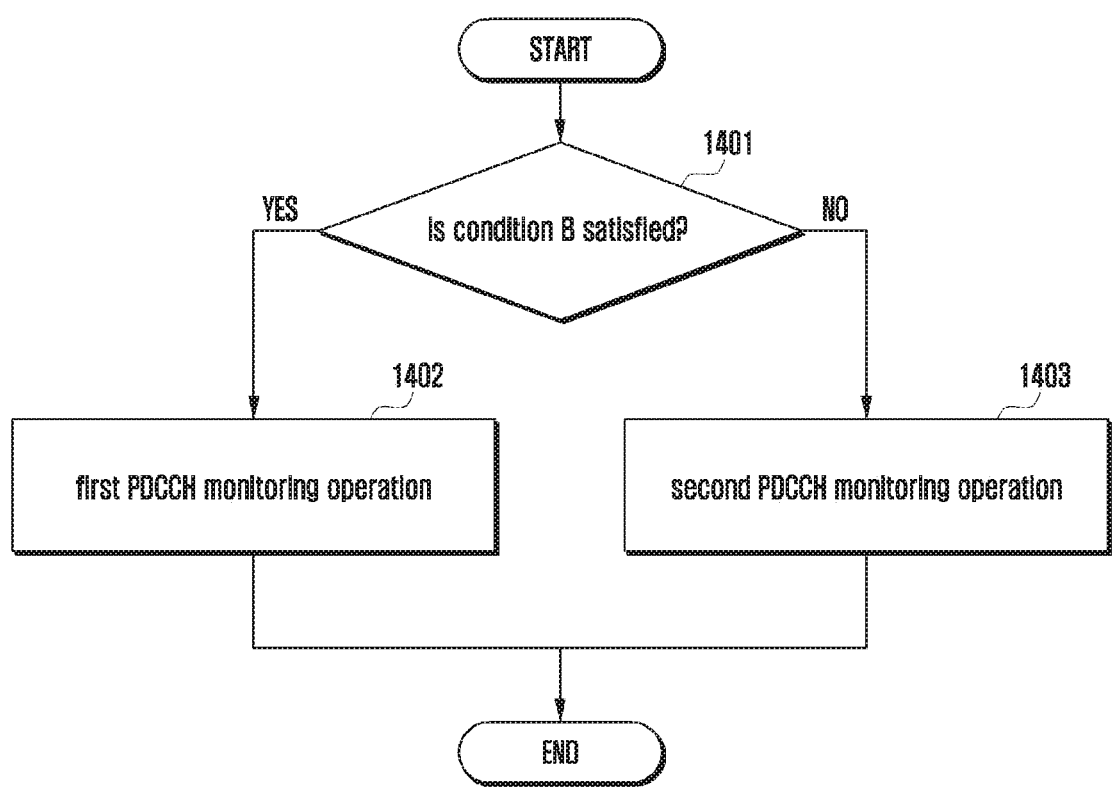
FIG. 14 is a diagram illustrating a UE operation in a PDCCH reception method, according to an embodiment of the disclosure.

FIG. 14 is a diagram illustrating a UE operation in a PDCCH reception method, according to an embodiment of the disclosure.

A UE determines whether condition B is satisfied, in operation 1401. When condition B is satisfied, the UE performs a first PDCCH monitoring operation, in operation 1402. When condition B is not satisfied, the UE performs a second PDCCH monitoring operation, in operation 1403.

Condition B may correspond to at least one of the following conditions or a combination of one or more of the following conditions.

- When a resource region for a PDCCH to be received by the UE entirely or partly overlaps with the time/frequency resource region corresponding to the rate matching resource and a CORESET configured with duration less than or equal to X symbols is configured for the PDCCH
- When a resource region for a PDCCH to be received by the UE entirely or partly overlaps with the time/frequency resource region corresponding to the rate matching resource and the UE is configured to monitor a DCI format for a specific use or traffic (e.g., when the UE is configured to monitor specific DCI format Y defined for use X, where use X is, for example, a different use other than eMBB, and the different use may correspond to, for example, a use for supporting a UE having lower performance than that of a UE corresponding to eMBB)
- When a resource region for a PDCCH to be received by the UE entirely or partly overlaps with the time/frequency resource region corresponding to the rate matching resource and the UE is configured to operate in a specific transmission/reception mode (e.g., a transmission/reception mode other than a transmission/reception mode corresponding to eMBB, which may be, for example, a use for supporting a UE having lower performance than that of a terminal corresponding to eMBB)

When a resource region for a PDCCH to be received by the UE entirely or partly overlaps with the time/frequency resource region corresponding to the rate matching resource and PDCCH mode A defined in the previous embodiment is explicitly configured The first PDCCH monitoring operation may correspond to the following PDCCH monitoring operation.

Monitoring of the PDCCH may not be performed.

The second PDCCH monitoring operation may correspond to at least one of the following PDCCH monitoring operations.

The UE may monitor the PDCCH assuming that the PDCCH is subjected to rate matching in the overlapping region. That is, the UE may monitor the PDCCH assuming that the PDCCH is mapped only to a resource region corresponding to the CORESET excluding the overlapping region.

The UE may transmit or receive the PDCCH by puncturing the PDCCH in the overlapping region. That is, the UE may monitor the PDCCH assuming that the PDCCH is mapped to the resource region corresponding to the CORESET, but transmission is not performed in the overlapping region.

When the duration of a control resource region configured for a PDCCH is sufficiently long (or may correspond to PDCCH mode B defined in embodiment 1), the UE can receive a PDCCH via a non-overlapping resource region even though some resources overlap with a rate matching resource, thus performing a PDCCH monitoring operation in a corresponding CORESET as defined in the second PDCCH monitoring operation.

Figure 15:
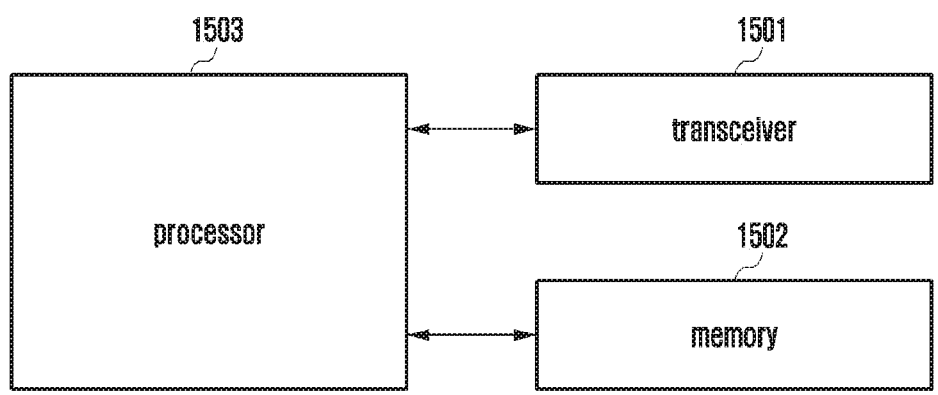
FIG. 15 is a block diagram illustrating the internal structure of a UE, according to an embodiment of the disclosure.
Figure 16:
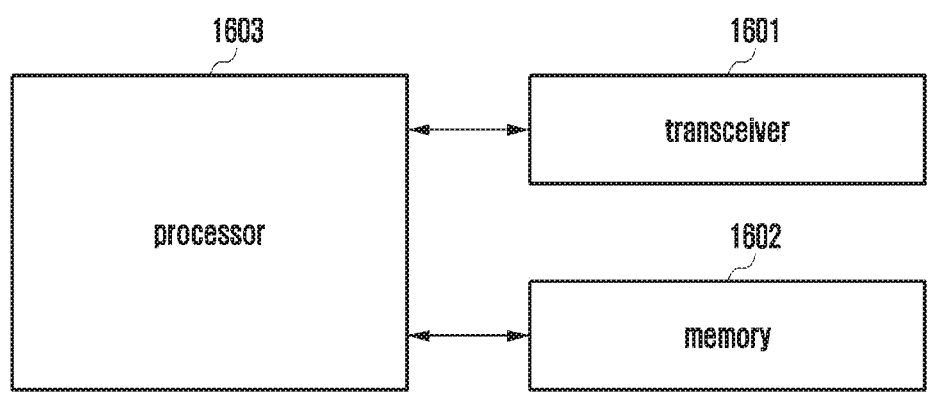
FIG. 16 is a block diagram illustrating the internal structure of a base station, according to an embodiment of the disclosure.

In order to carry out the above described embodiments, transceivers, memories, and processors of a UE and a base station are illustrated in FIG. 15 and FIG. 16, respectively. In the above described embodiments, a repeated transmission configuration method for a PDCCH and transmission/reception methods of a base station and a UE for a multi-beam-based transmission/reception scheme for a PDCCH are illustrated. To perform these methods, the transceivers, the memories, and the processors of the base station and the UE need to operate according to the embodiments.

FIG. 15 is a diagram illustrating the structure of a UE, according to an embodiment of the disclosure.

The UE includes a transceiver 1501, a memory 1502, and a processor 1503. However, components of the UE are not limited to the foregoing examples. For example, the UE may include a greater number of components or a smaller number of components than that of the foregoing examples. In addition, the transceiver 1501, the memory 1502, and the processor 1503 may be configured as a single chip.

The transceiver 1501 may transmit and receive a signal to and from a base station. The signal may include control information and data. To this end, the transceiver 1501 may include an RF transmitter to upconvert and amplify the frequency of a transmitted signal and an RF receiver to low-noise amplify and downconvert a received signal. Further, the transceiver 1501 may receive a signal through a radio channel to output the signal to the processor 1503 and may transmit a signal output from the processor 1503 through a radio channel.

The memory 1502 may store a program and data necessary for an operation of the UE. Further, the memory 1502 may store control information or data included in a signal transmitted or received by the UE. The memory 1502 may be configured as a storage medium, such as ROM, RAM, hard disk, CD-ROM, and DVD, or a combination of storage media. The memory 1502 may include a plurality of memories. The memory 1502 may store a program to control PDCCH monitoring and to receive a PDCCH by the UE.

The processor 1503 may control a series of processes so that the UE can operate according to the above embodiments. For example, the processor 1503 may control monitoring of a downlink control channel according to the embodiments.

Specifically, the processor 1503 may control the transceiver 1501 to receive configuration information about a PDCCH from a base station, may monitor a PDCCH from the base station based on the configuration information about the PDCCH from the base station, and may control each component of the UE to perform an operation of detecting the PDCCH based on monitoring.

In a another example, the processor 1503 may control the transceiver 1501 to receive high-layer signaling including information about a CORESET from the base station, may determine a PDCCH mode according to one embodiment, and may perform blind decoding on control information received from the base station based on the determined PDCCH mode.

The processor 1503 may include a plurality of processors, and may execute a program stored in the memory 1502, thereby performing a method for controlling monitoring of a downlink control channel and receiving a downlink control channel according to the embodiments.

FIG. 16 is a diagram illustrating the structure of a base station, according to an embodiment of the disclosure.

Referring to FIG. 16, the base station includes a transceiver 1601, a memory 1602, and a processor 1603. However, components of the base station are not limited to the foregoing examples. For example, the base station may include a greater number of components or a smaller number of components than that of the foregoing examples. In addition, the transceiver 1601, the memory 1602, and the processor 1603 may be configured as a single chip.

The transceiver 1601 may transmit and receive a signal to and from a UE. The signal may include control information and data. To this end, the transceiver 1601 may include an RF transmitter to upconvert and amplify the frequency of a transmitted signal and an RF receiver to low-noise amplify and downconvert a received signal. Further, the transceiver 1601 may receive a signal through a radio channel to output the signal to the processor 1603 and may transmit a signal output from the processor 1603 through a radio channel.

The memory 1602 may store a program and data necessary for an operation of the base station. Further, the memory 1602 may store control information or data included in a signal transmitted or received by the base station. The memory 1602 may be configured as a storage medium, such as ROM, RAM, hard disk, CD-ROM, and DVD, or a combination of storage media. The memory 1602 may include a plurality of memories. The memory 1602 may store a method for controlling monitoring of a downlink control channel by the UE and a program to generate and transmit a downlink control channel for the UE.

The processor 1603 may control a series of processes so that the base station can operate according to the above embodiments. For example, the processor 1603 may control a method for controlling monitoring of a downlink control channel by the UE and each component of the base station to generate and transmit a downlink control channel.

Specifically, the processor 1603 may control the transceiver 1601 to transmit high-layer signaling including information about a CORESET to the UE and to transmit control information about the UE based on the information about the CORESET.

The processor 1603 may include a plurality of processors, and may execute a program stored in the memory 1602, thereby performing a method for controlling monitoring of a downlink control channel by the UE and a method for generating and transmitting a downlink control channel according to the embodiments.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods, according to various embodiments of the disclosure, as defined by the appended claims and/or disclosed herein.

The programs (software modules or software) may be stored in non-volatile memories including a random access memory (RAM) and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical spirit of the disclosure. Further, the above respective embodiments may be employed in combination, as necessary. For example, the embodiments of the disclosure may be partially combined with other embodiments to operate a base station and a terminal. Further, the embodiments of the disclosure may also be applied to other communication systems, and other variants based on the technical idea of the embodiments may be implemented. For example, the embodiments of the disclosure may also be applied to LTE, 5G, or NR systems.

What is claimed is:

1. A method performed by a terminal in a wireless communication system, the method comprising:
   receiving, from a base station, configuration information on a search space for monitoring a physical downlink control channel (PDCCH), the configuration information including information on a plurality of control resource sets (CORESETs) for the PDCCH;
   identifying a PDCCH candidate set for each of the plurality of CORESETs, based on the configuration information and an offset, wherein the offset is used to adjust an index of a control channel element (CCE) in each PDCCH candidate set;
   determining the search space based on the identified PDCCH candidate set for each of the plurality of CORESETs; and
   monitoring the PDCCH based on the search space.

2. The method of claim 1, further comprising:
   receiving, from the base station, information on the offset via higher layer signaling.

3. The method of claim 2,
   wherein the information on the offset includes a respective offset value applied to each of the plurality of CORESETs.

4. The method of claim 1, further comprising:
   receiving, from the base station, information on a PDCCH type indicating that the PDCCH is mapped to CCEs associated with the plurality of CORESETs.

5. The method of claim 4,
   wherein a number of the CCEs to which the PDCCH mapped is determined based on a number of the plurality of CORESETs and an aggregation level for each of the plurality of CORESETs.

6. A method performed by a base station in a wireless communication system, the method comprising:
   transmitting, to a terminal, configuration information on a search space for monitoring a physical downlink control channel (PDCCH), the configuration information including information on a plurality of control resource sets (CORESETs) for the PDCCH; and
   transmitting, to the terminal, the PDCCH in the search space,
   wherein a PDCCH candidate set for each of the plurality of CORESETs is identified, based on the configuration information and an offset, wherein the offset is used to adjust an index of a control channel element (CCE) in each PDCCH candidate set, and
   wherein the search space is determined based on the identified PDCCH candidate set for each of the plurality of CORESETs.

7. The method of claim 6, further comprising:
   transmitting, to the terminal, information on the offset via higher layer signaling.

8. The method of claim 7,
   wherein the information on the offset includes a respective offset value applied to each of the plurality of CORESETs.

9. The method of claim 6, further comprising:
   transmitting, to the terminal, information on a PDCCH type indicating that the PDCCH is mapped to CCEs associated with the plurality of CORESETs.

10. The method of claim 9,
    wherein a number of the CCEs to which the PDCCH mapped is determined based on a number of the plurality of CORESETs and an aggregation level for each of the plurality of CORESETs.

11. A terminal in a wireless communication system, the terminal comprising:
a transceiver; and
a controller configured to:
control the transceiver to receive, from a base station, configuration information on a search space for monitoring a physical downlink control channel (PDCCH), the configuration information including information on a plurality of control resource sets (CORESETs) for the PDCCH;
identify a PDCCH candidate set for each of the plurality of CORESETs, based on the configuration information and an offset, wherein the offset is used to adjust an index of a control channel element (CCE) in each PDCCH candidate set;
determine the search space based on the identified PDCCH candidate set for each of the plurality of CORESETs; and
monitor the PDCCH based on the search space.

12. The terminal of claim 11, wherein the controller is further configured to control the transceiver to receive, from the base station, information on the offset via higher layer signaling.

13. The terminal of claim 12, wherein the information on the offset includes a respective offset value applied to each of the plurality of CORESETs.

14. The terminal of claim 11, wherein the controller is further configured to control the transceiver to receive, from the base station, information on a PDCCH type indicating that the PDCCH is mapped to CCEs associated with the plurality of CORESETs.

15. The terminal of claim 14,
wherein a number of the CCEs to which the PDCCH mapped is determined based on a number of the plurality of CORESETs and an aggregation level for each of the plurality of CORESETs.

16. A base station in a wireless communication system, the base station comprising:
a transceiver; and
a controller configured to:
control the transceiver to transmit, to a terminal, configuration information on a search space for monitoring a physical downlink control channel (PDCCH), the configuration information including information on a plurality of control resource sets (CORESETs) for the PDCCH; and
control the transceiver to transmit, to the terminal, the PDCCH in the search space,
wherein a PDCCH candidate set for each of the plurality of CORESETs is identified, based on the configuration information and an offset, wherein the offset is used to adjust an index of a control channel element (CCE) in each PDCCH candidate set, and
wherein the search space is determined based on the identified PDCCH candidate set for each of the plurality of CORESETs.

17. The base station of claim 16, wherein the controller is further configured to control the transceiver to transmit, to the terminal, information on the offset via higher layer signaling.

18. The base station of claim 17,
wherein the information on the offset includes a respective offset value applied to each of the plurality of CORESETs.

19. The base station of claim 16, wherein the controller is further configured to control the transceiver to transmit, to the terminal, information on a PDCCH type indicating that the PDCCH is mapped to CCEs associated with the plurality of CORESETs.

20. The base station of claim 19,
wherein a number of the CCEs to which the PDCCH mapped is determined based on a number of the plurality of CORESETs and an aggregation level for each of the plurality of CORESETs.

* * * * *